(12) United States Patent
Sternberg et al.

(10) Patent No.: US 11,630,783 B2
(45) Date of Patent: *Apr. 18, 2023

(54) MANAGEMENT OF ACCESSES TO TARGET STORAGE RESOURCES

(71) Applicant: Intel Corporation, Santa Clara, CA (US)

(72) Inventors: Jay E. Sternberg, North Plains, OR (US); Phil C. Cayton, Warren, OR (US); James P. Freyensee, Hillsboro, OR (US); Dave B. Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/220,830

(22) Filed: Apr. 1, 2021

(65) Prior Publication Data

US 2021/0311882 A1 Oct. 7, 2021

Related U.S. Application Data

(63) Continuation of application No. 16/240,705, filed on Jan. 4, 2019, now Pat. No. 10,970,231, which is a
(Continued)

(51) Int. Cl.
*G06F 13/00* (2006.01)
*G06F 12/109* (2016.01)
*G06F 9/455* (2018.01)

(52) U.S. Cl.
CPC ........ *G06F 12/109* (2013.01); *G06F 9/45533* (2013.01); *G06F 9/455* (2013.01);
(Continued)

(58) Field of Classification Search
CPC .... G06F 12/109; G06F 9/45533; G06F 9/455; G06F 2009/45579; G06F 2212/657
(Continued)

(56) References Cited

U.S. PATENT DOCUMENTS

| | | |
|---|---|---|
| 5,396,637 A | 3/1995 | Harwell et al. |
| 5,603,038 A | 2/1997 | Crump et al. |

(Continued)

FOREIGN PATENT DOCUMENTS

| | | |
|---|---|---|
| CN | 104572516 A | 4/2015 |
| CN | 102959525 A | 7/2016 |

(Continued)

OTHER PUBLICATIONS

First Office Action for U.S. Appl. No. 16/381,994, dated Oct. 28, 2021, 26 pages.

(Continued)

*Primary Examiner* — Shawn X Gu
(74) *Attorney, Agent, or Firm* — Compass IP Law PC

(57) ABSTRACT

Provided are a computer product, method, and system to virtualize target system storage resources as virtual target storage resources. Target storage resources available at a target system are discovered over a network. A configuration is determined of virtual target storage resources mapping to the target storage resources for a host node. The configuration is registered with a virtual target. The configuration maps the virtual target storage resources to the target storage resources at the target system and an access control list of the host node allowed to access the virtual target storage resources. A query is received from the host node for the target storage resources the host node is permitted to access according to the access control list. Host discovery information is returned to the requesting host node indicating the
(Continued)

virtual target storage resources the requesting host node is provisioned to access from the virtual target.

19 Claims, 11 Drawing Sheets

Related U.S. Application Data continuation of application No. 15/279,318, filed on Sep. 28, 2016, now Pat. No. 10,176,116.

(52) U.S. Cl.
CPC .............. *G06F 2009/45579* (2013.01); *G06F 2212/657* (2013.01)

(58) Field of Classification Search
USPC .......................... 711/154, 6, 202, 203, 111
See application file for complete search history.

(56) References Cited

U.S. PATENT DOCUMENTS

| | | | |
|---|---|---|---|
| 5,809,526 A | 9/1998 | Patel | |
| 5,860,083 A | 1/1999 | Sukegawa | |
| 5,978,924 A | 11/1999 | Ahn | |
| 6,393,518 B2 | 5/2002 | Koivuniemi | |
| 6,523,102 B1 | 2/2003 | Dye et al. | |
| 6,535,996 B1 | 3/2003 | Brewer et al. | |
| 6,968,424 B1 | 11/2005 | Danilak | |
| 7,146,455 B2 | 12/2006 | Cheng | |
| 7,260,695 B2 | 8/2007 | Batchelor et al. | |
| 7,437,597 B1 | 10/2008 | Kruckemyer et al. | |
| 7,653,699 B1 | 1/2010 | Colgrove et al. | |
| 7,716,525 B1 | 5/2010 | Buchko et al. | |
| 7,802,145 B1 | 9/2010 | Bainbridge et al. | |
| 7,954,006 B1 | 5/2011 | Mangipudi | |
| 8,069,309 B1 | 11/2011 | Long | |
| 8,325,554 B2 | 12/2012 | Sweere et al. | |
| 8,510,598 B2 | 8/2013 | Vedder et al. | |
| 8,612,676 B2 | 12/2013 | Dahlen et al. | |
| 8,966,164 B1 | 2/2015 | Asnaashar et al. | |
| 10,013,168 B2 | 7/2018 | Cayton et al. | |
| 10,176,116 B2* | 1/2019 | Sternberg | G06F 9/45533 |
| 10,200,376 B2 | 2/2019 | Cayton et al. | |
| 10,275,160 B2 | 4/2019 | Freyensee et al. | |
| 10,620,840 B2 | 4/2020 | Freyensee et al. | |
| 10,893,050 B2 | 1/2021 | Cayton et al. | |
| 10,970,231 B2* | 4/2021 | Sternberg | G06F 9/45533 |
| 2002/0095602 A1 | 7/2002 | Pherson et al. | |
| 2003/0191734 A1* | 10/2003 | Voigt | G06F 16/10 |
| 2006/0015683 A1 | 1/2006 | Ashmore et al. | |
| 2006/0126833 A1 | 6/2006 | O'Leary et al. | |
| 2006/0138231 A1 | 6/2006 | Elberbaum | |
| 2006/0274566 A1 | 12/2006 | Takashima et al. | |
| 2007/0124604 A1 | 5/2007 | Feldstein et al. | |
| 2007/0229521 A1 | 10/2007 | Li et al. | |
| 2007/0294543 A1 | 12/2007 | Chiang | |
| 2009/0172372 A1 | 7/2009 | Kumar et al. | |
| 2009/0182962 A1 | 7/2009 | Khmelnitsky et al. | |
| 2009/0254705 A1 | 10/2009 | Abali et al. | |
| 2009/0271563 A1 | 10/2009 | Gopalan et al. | |
| 2009/0313416 A1 | 12/2009 | Nation | |
| 2010/0011155 A1 | 1/2010 | Kitagawa | |
| 2010/0011261 A1 | 1/2010 | Cagno et al. | |
| 2010/0080057 A1 | 4/2010 | Reuter et al. | |
| 2010/0095053 A1 | 4/2010 | Bruce et al. | |
| 2010/0114889 A1 | 5/2010 | Rabii et al. | |
| 2010/0198972 A1 | 8/2010 | Umbehocker | |
| 2010/0202240 A1 | 8/2010 | Moshayedi et al. | |
| 2011/0161748 A1 | 6/2011 | Casper et al. | |
| 2011/0231594 A1 | 9/2011 | Sugimoto et al. | |
| 2011/0321123 A1 | 12/2011 | Ishikawa | |
| 2012/0047314 A1 | 2/2012 | Chen et al. | |
| 2012/0096332 A1 | 4/2012 | Furno et al. | |
| 2012/0166891 A1 | 6/2012 | Dahlen et al. | |
| 2012/0198136 A1 | 8/2012 | Moshayedi et al. | |
| 2012/0271990 A1 | 10/2012 | Chen et al. | |
| 2013/0019048 A1 | 1/2013 | Bland et al. | |
| 2013/0019076 A1 | 1/2013 | Amidi et al. | |
| 2014/0068200 A1 | 3/2014 | Schnapp et al. | |
| 2014/0189203 A1 | 7/2014 | Suzuki et al. | |
| 2014/0201562 A1 | 7/2014 | Breakstone et al. | |
| 2014/0281040 A1 | 9/2014 | Liu | |
| 2014/0304461 A1 | 10/2014 | Kitahara et al. | |
| 2015/0089287 A1 | 3/2015 | Jayakumar et al. | |
| 2015/0095554 A1 | 4/2015 | Asnaashar et al. | |
| 2015/0134880 A1 | 5/2015 | Danilak et al. | |
| 2015/0143134 A1 | 5/2015 | Hashimoto | |
| 2015/0212734 A1* | 7/2015 | Asnaashari | G06F 13/28 711/103 |
| 2015/0248366 A1 | 9/2015 | Bergsten et al. | |
| 2015/0319237 A1 | 11/2015 | Hussain et al. | |
| 2015/0319243 A1 | 11/2015 | Hussain et al. | |
| 2016/0085718 A1 | 3/2016 | Huang | |
| 2016/0188414 A1 | 6/2016 | Jayakumar et al. | |
| 2017/0123656 A1 | 5/2017 | Benisty et al. | |
| 2017/0177216 A1 | 6/2017 | Freyensee et al. | |
| 2017/0185310 A1 | 6/2017 | Cayton et al. | |
| 2017/0344259 A1 | 11/2017 | Freyensee et al. | |
| 2018/0004559 A1 | 1/2018 | Geml et al. | |
| 2018/0088978 A1 | 3/2018 | Li et al. | |
| 2018/0188974 A1 | 7/2018 | Cayton et al. | |
| 2018/0260148 A1 | 9/2018 | Klein | |
| 2019/0238545 A1 | 8/2019 | Cayton et al. | |
| 2019/0243777 A1 | 8/2019 | Sternberg et al. | |
| 2019/0303003 A1 | 10/2019 | Freyensee et al. | |

FOREIGN PATENT DOCUMENTS

| | | |
|---|---|---|
| KR | 20140142530 A | 12/2014 |
| TW | I225589 B | 12/2004 |
| TW | 201118546 A | 6/2011 |
| WO | 2003060716 A1 | 7/2003 |
| WO | 2006039711 A1 | 4/2006 |
| WO | 2015041698 A1 | 3/2015 |
| WO | 2015080690 A1 | 6/2015 |
| WO | 2016105814 A1 | 6/2016 |
| WO | 2017112021 A1 | 6/2017 |
| WO | 2017112285 A1 | 6/2017 |
| WO | 2018038840 A2 | 3/2018 |

OTHER PUBLICATIONS

"Intel Xeon Processor C550/C3500 Series-based Platform for Storage Applications" 2010, 6 pages, Intel Corporation, USA.
"NVM Express" retrieved from http://www.nvmexpress.org on Nov. 8, 2015, 2 pages.
"PCI Express Base Specification", Specification, Nov. 10, 2010, 860 pages, Revision 3.0, PCI-SIG, Beaverton, OR.
Christie, M., et al., "Red Hat Enterprise Linux 5 Online Storage Reconfiguration Guide", Red Hat Enterprise Linux 5, Edition 1 ,© 2008, 43 pp.
First Office Action for U.S. Appl. No. 15/279,318, dated Feb. 22, 2018 7 pages.
International Search Report and Written Opinion for International Application No. PCT/US2017/029982, dated Jul. 28, 2017, 14 pp. (77.346PCT (ISR & WO).
International Search Report and Written Opinion for International Application No. PCT/US2017/043568, dated Oct. 20, 2017, 15 pp.
International Search Report and Written Opinion received for International Application No. PCT/US2011/061466, dated Jul. 31, 2012, 7 pages.
International Search Report and Written Opinion received for International Application No. PCT/US2013/061188, dated Jun. 20, 2014, 10 pages.
International Search Report and Written Opinion received for International Application No. PCT/US2015/062555, dated Mar. 15, 2016, 11 pages.
International Search Report and Written Opinion received for International Application No. PCT/US2016/055226, dated Jan. 19, 2017, 13 pages.

(56) References Cited

OTHER PUBLICATIONS

International Search Report and Written Opinion received for International Application No. PCT/US2016/063551, dated Mar. 13, 2017, 11 pages.
Marks, K., "An NVM Express Tutorial", Flash Memory Summit 2013, 92 pp.
Minturn, D., "NVM Express Over Fabrics", Mar. 15-18, 2015, NVM Express, Total 13 pp.
Notice of Allowance for U.S. Appl. No. 15/246,361, dated Sep. 19, 2018, 17 pp.
NVM Express, Inc., "NVM Express Over Fabrics", Revision 1.0, Jun. 5,2106, © 2007-2016, Total 49 pp.
NVM Express, Inc., "NVM Express", Revision 1.2a, Oct. 23, 2015, © 2007-2015, Total 209 pp.
Office Action 1 for U.S. Appl. No. 15/246,361, dated May 2, 2018, 23 pp.
Onufryk, P., "What's New in NVMe 1.1 and Future Directions", NVM Express, Flash Memory Summit 2013, Santa Clara, CA, Total 26 pp.
Response to Office Action 1 for U.S. Appl. No. 15/246,361, dated Aug. 2, 2018, 23 pp.
Sardella, S., "NVMe Over Fabrics Agenda", Aug. 11, 2015, NVM Express, Total 14 pp.
U.S. Appl. No. 14/976,949, filed Dec. 21, 2015, entitled "Method and Apparatus to Enable Individual NVMe IO Queues an Differing Network Addresses of an NVMe Controller", invented by Freyensee, J.P. et al.
U.S. Appl. No. 14/998,061, filed Dec. 24, 2015, entitled "Method and Apparatus for Disaggregating NVME Storage Controller Stack", invented by Clayton, P.C. et al.
U.S. Appl. No. 15/167,908, filed May 27, 2016, entitled "A Computer Product, Method, and System to Dynamically Manage Storage Devices Accessed Remotely Over a Network", Invented by Freyensee, J.P. et al.
U.S. Appl. No. 15/246,361, filed May 27, 2016, entitled "A Computer Product, Method, and System to Dynamically Provide Discovery Services for Host Nodes of Target Systems and Storage Resources in a Network", Invented by P.C. Cayton et al.
Wikipedia, "Internet Storage Name Service", [online], last modified on Aug. 12, 2016, [Retrieved on Sep. 18, 2016], retrieved from the Internet at, 2 pp.

\* cited by examiner

Discovery Database Entry

MANAGEMENT OF ACCESSES TO TARGET STORAGE RESOURCES

CROSS-REFERENCED WITH RELATED APPLICATIONS

This application is a continuation of U.S. patent application Ser. No. 16/240,705, filed Jan. 4, 2019, and is now U.S. Pat. No. 10,970,231, which is a continuation of U.S. patent application Ser. No. 15/279,318, filed Sep. 28, 2016, and is now U.S. Pat. No. 10,176,116. The entire specifications of which are hereby incorporated herein by reference in their entirety.

TECHNICAL FIELD

Embodiments described herein generally relate to a computer product, method, and system to provide a virtual target to virtualize target system storage resources as virtual target storage resources.

BACKGROUND

Non-Volatile Memory Express (NVMe) is a logical device interface (http://www.nvmexpress.org) for accessing non-volatile storage media attached via a Peripheral Component Interconnect Express (PCIe) bus (http://www.pcsig.com). The non-volatile storage media may comprise a flash memory and solid solid-state drives (SSDs). NVMe is designed for accessing low latency storage devices in computer systems, including personal and enterprise computer systems, and is also deployed in data centers requiring scaling of thousands of low latency storage devices. A computer system may communicate read/write requests over a network to a target system managing access to multiple attached storage devices, such as SSDs. The computer system sending the NVMe request may wrap the NVMe read/write request in a network or bus protocol network packet, e.g., Peripheral Component Interconnect Express (PCIe), Remote Direct Memory Access (RDMA), Fibre Channel, etc., and transmit the network packet to a target system, which extracts the NVMe request from the network packet to process.

In NVMe environments, host nodes discover target systems having storage resources and then connect directly with the target systems to obtain connection information and connect to the target systems.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Figure 1:
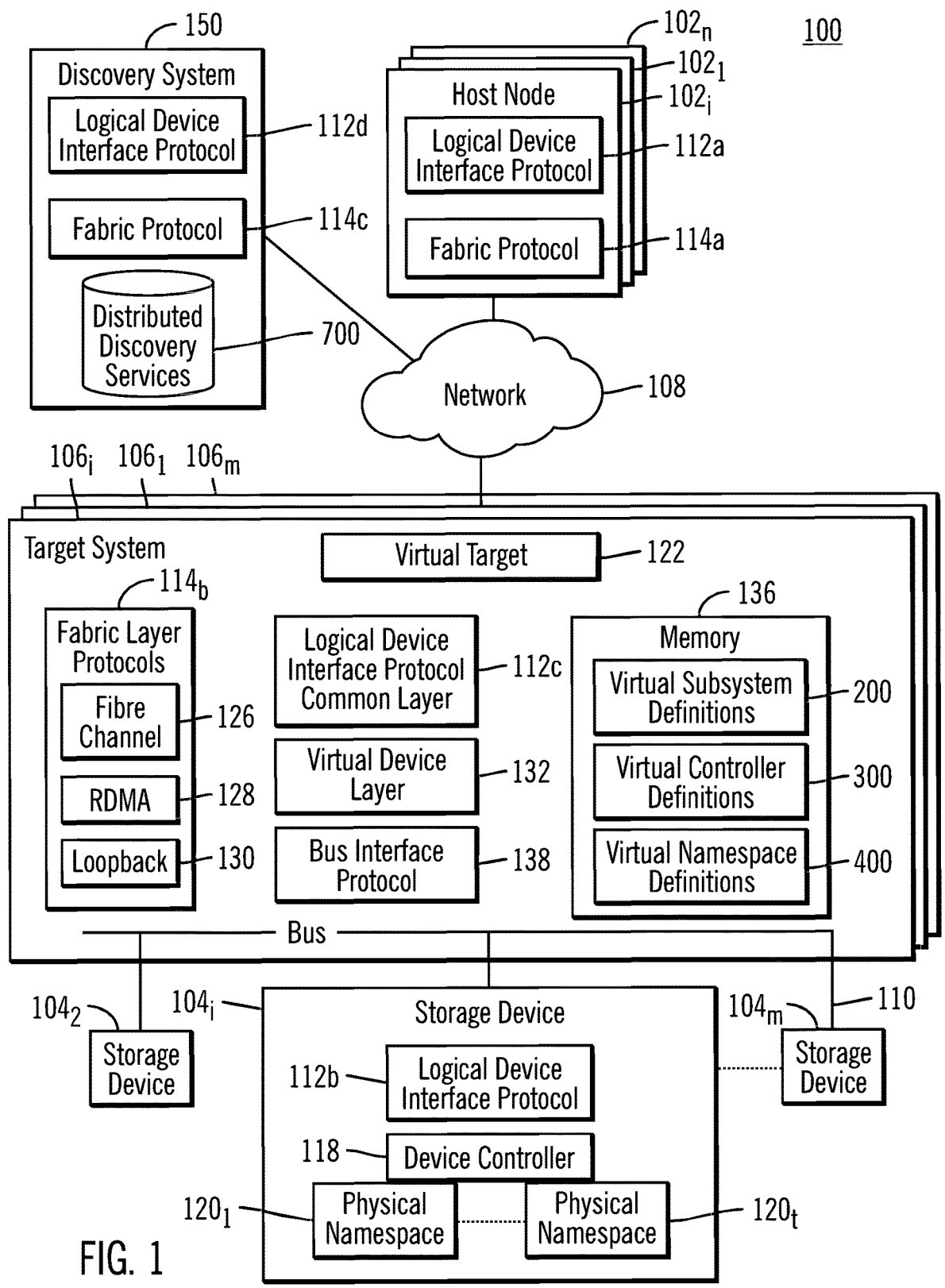
FIG. 1 illustrates an embodiment of a storage environment

A target system includes an NVMe subsystem with one or more controllers to manage read/write requests to namespace identifiers (NSID) defining ranges of addresses in the connected storage devices. The hosts may communicate to the NVMe subsystem over a fabric or network or a PCIe bus and port. Each network or PCIe port may connect to one NVMe subsystem, and the NVMe subsystem may communicate with the attached storage devices using a PCIe bus.

Currently, NVMe targets are representations of one or more NVMe controllers in a physical device and are functionally static. Described embodiments provide additional storage resource flexibility by defining programmable virtual target storage resources in virtual targets to provision to the hosts to provide an additional layer for authenticating host access to target system storage resources and provisioning the target system storage resources. In this way, a virtual target provides a representation of one or more NVMe targets that provide physical and virtual target storage resources.

Described embodiments provide a distributed discovery service on one or more separate systems in a network that discover target storage resources available at a target system over the network and determines a configuration of virtual target storage resources mapping to the target storage resources for one of the host nodes. The distributed discovery service registers, with a virtual target, the configuration of the virtual target storage resources, mapping to the target storage resources at the target system, and an access control list of the host node allowed to access the virtual target storage resources. The discovery service receives a query from a requesting host node, comprising one of the host nodes, for the target storage resources the host node is permitted to access according to the access control list. Host discovery information is returned to the requesting host node indicating the virtual target storage resources the requesting host node is provisioned to access from the virtual target according to the access control list, which map to the actual target storage resources available in the target system.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details.

In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a storage environment 100 having a plurality of host nodes $102_1 \ldots 102_n$ that communicate with multiple storage devices $104_1 \ldots 104_m$ via target systems $106_1 \ldots 106_m$. The host nodes $102_1 \ldots 102_n$ may communicate with the target systems $106_1 \ldots 106_m$ over a network 108, such as a Fabric, and a target system, as shown with respect to target system $106_i$, communicates with the storage devices $104_1 \ldots 104_m$ over a bus interface 110. Each of the host nodes $102_1 \ldots 102_n$, includes, as shown with respect to host node $102_i$, a logical device interface protocol 112a to perform read/write operations with respect to the storage devices $104_1 \ldots 104_m$ and a fabric protocol 114a to communicate over the network 108. Each of the storage devices $104_1 \ldots 104_m$ may include, as shown with respect to storage device $104_i$, a logical device interface protocol 112b, the same as the logical device interface protocol 112a, a device controller 118 to perform storage device $104_i$ operations, and one or more physical namespaces $120_1 \ldots 120_r$. A physical namespace comprises a quantity of non-volatile memory that may be formatted into logical blocks. When formatted, a namespace of size n is a collection of logical blocks with logical block addresses from 0 to (n−1). The namespaces may further be divided into partitions or ranges of addresses. The physical namespaces $120_1 \ldots 120_r$ are identified by a namespace identifier (NSID) used by the device controller 118 to provide access to the namespace $120_1 \ldots 120_r$.

The target system $106_i$ may include a virtual target 1000 that provides an interface between the target storage resources available at the target system $106_i$ and the host nodes $120_1 \ldots 120_r$. The virtual target 1000 may authenticate with the target subsystems (virtual and physical) in the target system $106_i$ and generate virtual subsystems/virtual controllers/virtual namespaces to map to corresponding target subsystems/target controllers/target namespaces in the target system 106i. The target storage resources, e.g., subsystem/controller/namespace, to which the virtual resources created by the virtual target 1000 map may comprise physical resources or virtual resources.

In the embodiment of FIG. 1, the virtual target 1000 is shown as a component running within the target system $106_i$. In alternative embodiments, the virtual target 1000 may reside in a system external to the target system $106_i$ that the virtual target 1000 virtualizes, such as described with respect to FIG. 9 below. In this way, the virtual target 1000 handles authentication and verification of the host access to target storage resources on behalf of the target systems $106_1 \ldots 106_m$. The virtual target 1000 has access to the target system storage resources by separately authenticating with the target subsystems.

The target system $106_i$ further includes one or more fabric layer protocols 114b, compatible with the fabric protocol 114a used by the host nodes $102_1 \ldots 102_n$ and the fabric controller 114c used by the discovery controller 150. The target system $106_i$ may support multiple fabric layer protocols, such as Fibre Channel 126, Remote Direct Memory Access (RDMA) 128, loopback interface 130, and other suitable transport layer protocols. The target system $106_i$ includes an instance of the logical device interface protocol common layer 112c to process the logical device interface protocol communications communicated from the host nodes $102_1 \ldots 102_n$. The virtual device layer 132 generates and manages virtualization definitions in a target system memory 136 that provide representations of target hardware and physical namespaces to the host nodes $102_1 \ldots 102_n$, including virtual subsystem definitions 200, virtual controller definitions 300, and virtualization namespace definitions 400. The target system $106_i$ further includes a bus interface protocol 138 to transmit logical device interface protocol read/write requests to the storage devices $104_1 \ldots 104_m$.

A discovery system 150 includes distributed discovery services 700 to enable host nodes $102_1 \ldots 102_n$ to discover and connect to target system $106_1 \ldots 106_m$ in the network 108. The discovery system 150 includes a logical device interface protocol 112d and fabric protocol 114c for network communication. There may be multiple discovery systems 150 deployed in the network 108 for the host nodes $102_1 \ldots 102_n$ to access.

In one embodiment, the logical device interface protocol 112a, 112b, 112c, 112d may comprise the Non-Volatile Memory Express (NVMe) protocol and the bus 110 and bus interface protocol 138 may comprise a Peripheral Component Interconnect Express (PCIe) bus. With described embodiments, a same NVMe read/write request may be transmitted from the host nodes $102_1 \ldots 102_n$ to the storage devices $104_1 \ldots 104_m$ without the need for conversion from one protocol to another. This use of the same logical device protocol request, e.g., NVMe, reduces latency in transmissions between the host nodes $102_1 \ldots 102_n$ and storage devices $104_1 \ldots 104_m$.

The address space of each of the namespaces in the storage devices $104_1 \ldots 104_m$ may be divided into one or more namespaces partitions, where each partition comprises a subset of addresses in a physical namespace $120_1 \ldots 120_r$. The host nodes $102_1 \ldots 102_n$ may further comprise any type of compute node capable of accessing storage partitions and performing compute operations.

The program components of the target system, such as 1000, 114b, 132, and 138 may be implemented in a software program executed by a processor of the target system 106, firmware, a hardware device, or in application specific integrated circuit (ASIC) devices, or some combination thereof.

The storage devices $104_1, 104_2 \ldots 104_m$ may comprise electrically erasable and non-volatile memory cells, such as flash storage devices, solid state drives, etc. For instance, the storage devices $104_1, 104_2 \ldots 104_m$ may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories or three bit per cell (TLC) memories. The storage devices $104_1, 104_2 \ldots 104_m$ may also comprise, but not limited to, ferroelectric random-access memory (FeTRAM), nanowire-based non-volatile memory, three-dimensional (3D) crosspoint memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The storage devices $104_1, 104_2 \ldots 104_m$ may also comprise a magnetic storage media, such as a hard disk drive etc.

The target system memory 136 may comprise a non-volatile or volatile memory type of device known in the art, such as a Flash Memory, a non-volatile dual in-line memory module (NVDIMM), Dynamic Random Access Memories (DRAMs), etc., or may also comprise, but not limited to, ferroelectric random-access memory (FeTRAM), nanowire-based non-volatile memory, three-dimensional (3D) crosspoint memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices, such as magnetic storage media, such as a hard disk drive etc. In certain embodiments, the target system memory 136 comprises a persistent, non-volatile storage of the virtual subsystem, virtual controller, and virtual namespace definitions to provide persistent storage over power cycle events.

Figure 2:
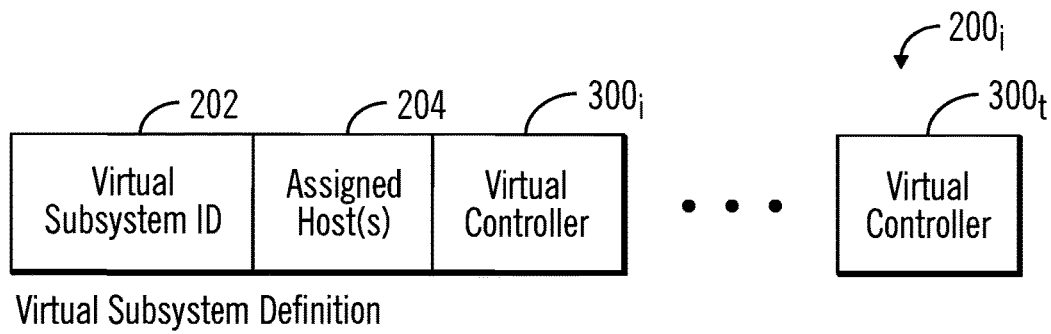
FIG. 2 illustrates an embodiment of a virtual subsystem definition to represent a subsystem to attached hosts.

FIG. 2 illustrates an embodiment of a virtual subsystem definition $200_i$ defining one of the virtual subsystems 200 configured in the target system 106, and includes: a virtual subsystem identifier (VSSID) 202; assigned hosts 204 comprising zero or more hosts assigned to use that virtual subsystem 202 to access the below storage devices $104_1 \ldots 104_m$; and one or more virtual controllers $300_1 \ldots 300_t$ configured in the virtual subsystem 202.

Figure 3:
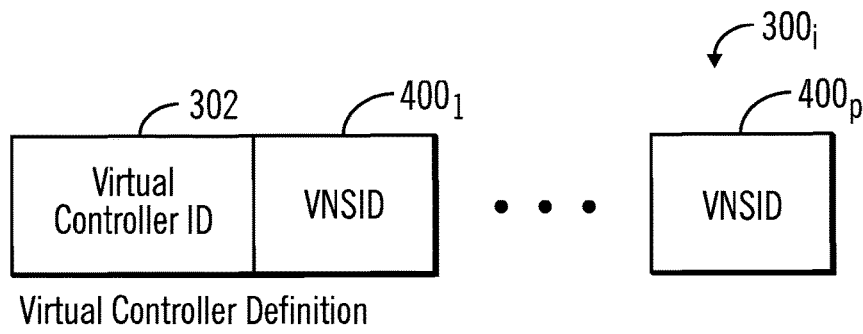
FIG. 3 illustrates an embodiment of a virtual controller definition within one of the virtual subsystems.

FIG. 3 illustrates an embodiment of a virtual controller definition $300_i$ to define one of the virtual controllers 300 configured in the target system 106, and includes: a virtual controller (VC) identifier 302 and one or more virtual namespaces $400_1 \ldots 400_p$, identified by a VNSID, assigned to that virtual controller 302. A virtual controller 300i may also have no assigned virtual namespaces.

Figure 4:
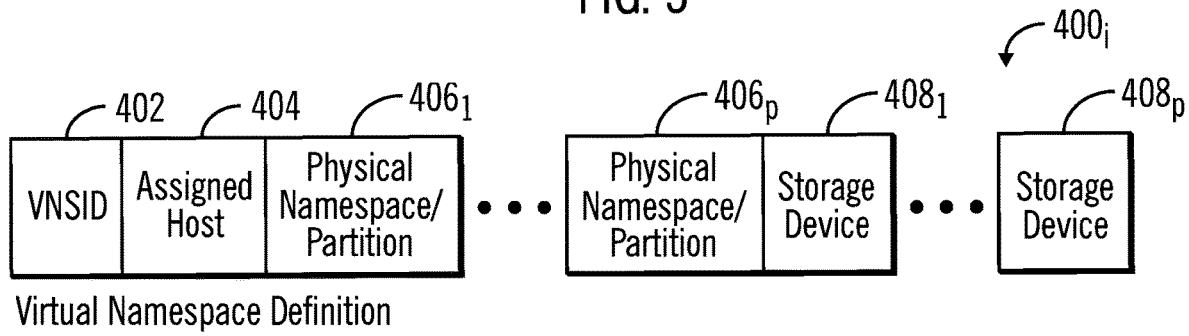
FIG. 4 illustrates a virtual namespace definition to define a virtual namespace that maps to a physical namespace/partition.

FIG. 4 illustrates an embodiment of a virtual namespace definition 400i, and includes: a virtual namespace identifier (VNSID) 402; an assigned host 404 assigned to use the VNSID 402 to access a physical namespace; one or more assigned physical namespace/partitions $406_1 \ldots 406_p$ and the storage device $408_1 \ldots 408_p$ including the physical namespace/partition $406_1 \ldots 406_p$. In certain embodiments, indication may be made in the assigned host 404 field or other part of the definition $400_i$ to allow any host, multiple hosts or no host to use the VNSID to access a physical namespace.

Figure 5:
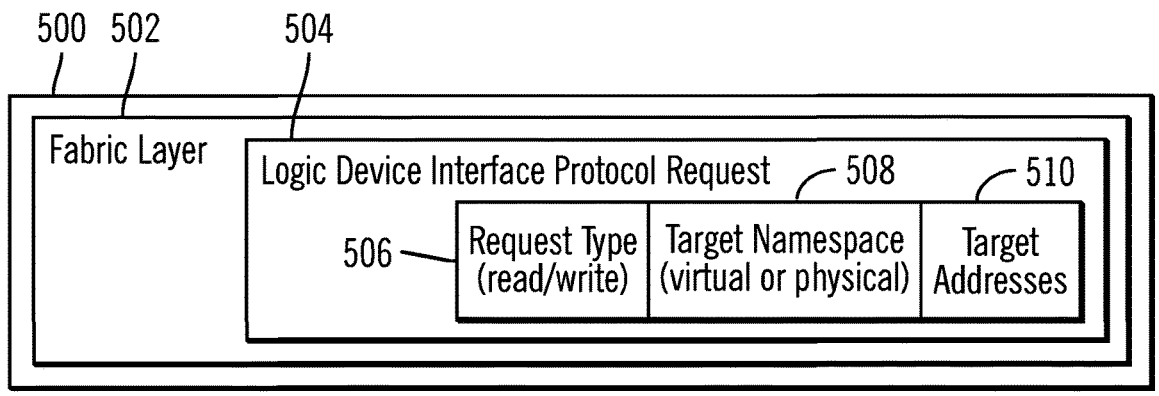
FIG. 5 illustrates an embodiment of a fabric packet.

FIG. 5 illustrates an embodiment of a fabric packet 500 for transmission across the network 108 having a fabric layer 502, including fabric information such as a header, error correction codes, source and destination addresses, and other information required for transmission across the network 108, and an encapsulated logic device interface protocol request 504, including a request type command 506, e.g., read or write; a target namespace 508, which may indicate a virtual namespace ID (VNSID) or physical namespace ID (NSID) to which the request 506 is directed; and specific target addresses 510 subject to the read/write request, which may comprise one or more logical block addresses which are subject to the requested read/write operation. The logic device interface protocol request 504 may include additional fields and information to process the request.

The virtual target 100 or other virtual device layer may configure the virtual subsystems 200, virtual controllers 300, and virtual namespaces 400 in the target memory 136 to represent to the attached host nodes $102_1 \ldots 102_n$.

Figure 6:
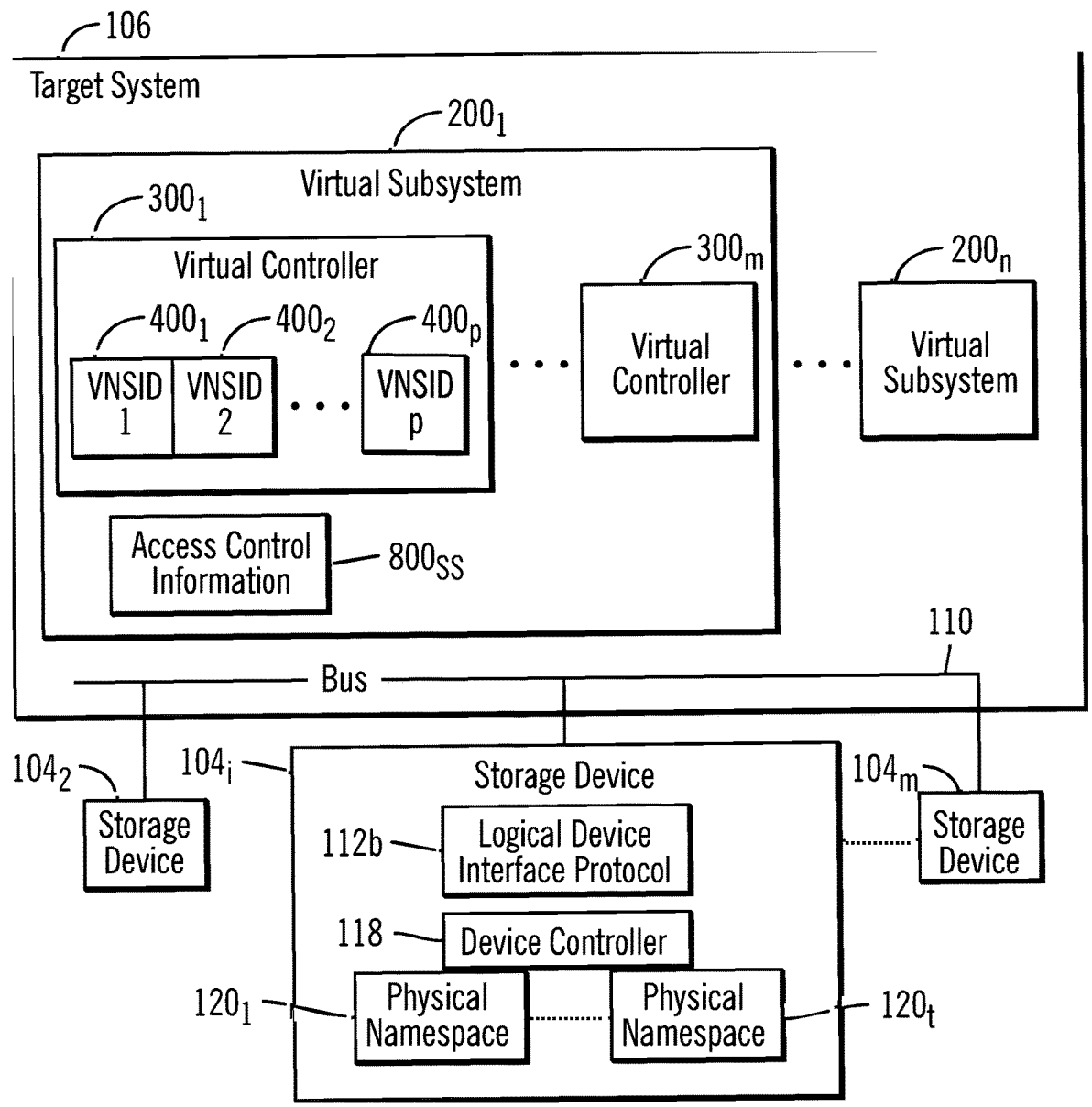
FIG. 6 illustrates an embodiment of virtual subsystem configurations.

FIG. 6 illustrates an embodiment of a representation of a configuration of virtual subsystems $200_1 \ldots 200_n$ in the target system 106, where each virtual subsystem $200_1 \ldots 200_n$ may include, as shown with respect to virtual subsystem $200_1$, one or more virtual controllers $300_1 \ldots 300_m$. Each virtual controller $300_1 \ldots 300_m$, as shown with respect to virtual controller $300_1$, can include one or more assigned virtual namespace identifiers (VNSID) $400_1 \ldots 400_p$. Each virtual namespace identifier $400_1 \ldots 400_p$, maps to one or more physical the namespaces $120_1 \ldots 120_t$ in the storage devices $104_1 \ldots 104_m$, including a partition (range of addresses in the namespace) or the entire namespace. Each of the host nodes $102_1 \ldots 102_n$ are assigned to one or more virtual subsystems $200_1 \ldots 200_n$, and further to one or more virtual namespace IDs $400_1 \ldots 400_p$ in the virtual controllers $300_1 \ldots 300_m$ of the virtual subsystems $200_1 \ldots 200_n$ to which the host node $102_i$ is assigned. The host nodes $102_1 \ldots 102_n$ may access the physical namespace $120_1 \ldots 120_t$ partitions that map to the virtual namespace IDs $400_1 \ldots 400_p$ assigned to the hosts, where the host nodes $102_1 \ldots 102_n$ access the virtual namespace through the virtual controller $300_i$ to which the VNSID is assigned and virtual subsystem $200_i$ to which the host node is assigned. The virtual subsystems $200_i$ may include access control information $800_{SS}$ which indicates subsets of hosts allowed to access subsets of virtual controllers $300_1 \ldots 300_m$ and namespaces (virtual or physical).

Different configurations of the virtual subsystems $200_1$ shown in FIG. 6 may be provided. For instance, the VNSIDs $400_1$ and $400_2$ in the virtual controller 300i may map to different partitions of a same physical namespace $120_1$ in storage device $104_1$, and/or one VNSID $400_3$ in a virtual controller $300_2$ may map to different physical namespaces $120_2$ and $120_3$ in storage device $104_2$. In this way, a write to the VNSID $400_3$ in the second virtual controller $300_2$ writes to two separate physical namespaces $120_2, 120_3$.

Additional configurations are possible. For instance, the same defined virtual namespace identifier that maps to one physical namespace may be included in two separate virtual controllers to allow for the sharing of a virtual namespace and the mapped physical namespace. Further, one virtual namespace can map to different physical namespaces or different partitions within a namespace in the same or different storage devices. A virtual namespace mapping to a physical namespace/partition may be included in multiple virtual controllers $300_i$ of one virtual subsystem to allow sharing of the virtual namespace by multiple hosts.

The host nodes $102_1 \ldots 102_n$ may address a virtual namespace, by including the virtual subsystem (VSS) name, the virtual controller (VC), and the virtual namespace identifier (VNSID) in a combined address, such as VSSname.VCname.VNSID. In this way, virtual namespace IDs in different virtual controllers may have the same number identifier but point to different physical namespaces/partitions. Alternatively, the same virtual namespace IDs in different virtual controllers may point to the same shared physical namespace/partition.

FIG. 6 shows implementations of virtual subsystems and controllers. In further embodiments, some or all of the subsystems and controllers may be implemented in physical hardware components and not virtualized. In such physical implementations, the controllers may be assigned physical namespaces $120_1 \ldots 120_t$ may address a namespace using the physical namespace $120_1 \ldots 120_t$ addresses.

Figure 7:
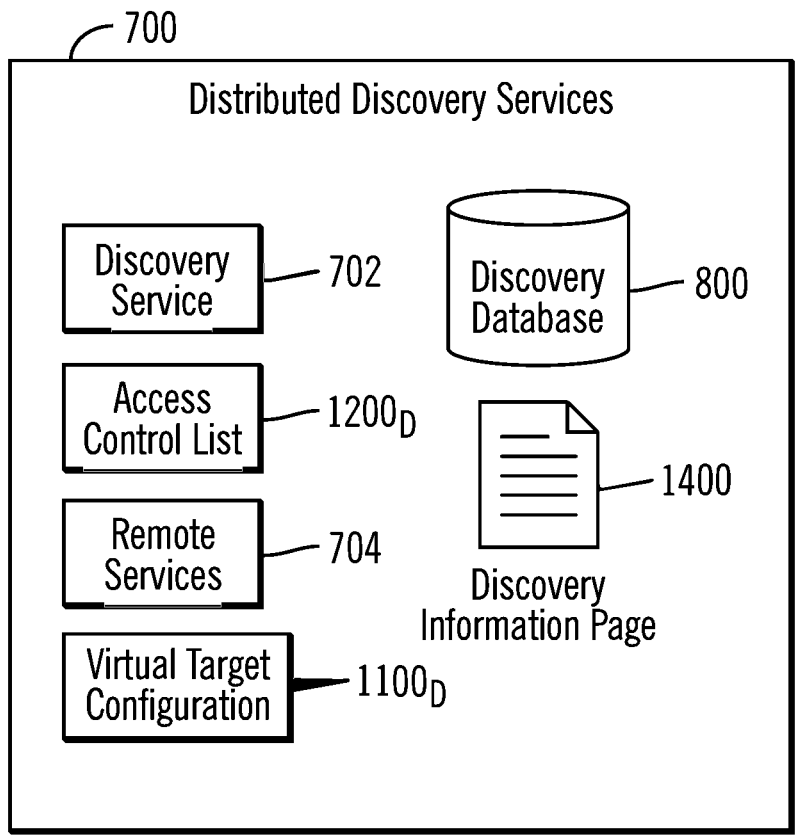
FIG. 7 illustrates an embodiment of distributed discovery services.

FIG. 7 illustrates an embodiment of the distributed discovery services 700 as including discovery service 702 comprising program code to perform discovery operations, access control list $1200_D$ having information on subsets of hosts that can access different subsets of virtual target storage resources configured in the virtual target 1000; a discovery database 800 having information on discovered target systems, including their subsystems, controllers, and namespace (physical and virtual); a virtual target configuration $1100_D$ providing information on virtual target storage resources configured in the virtual targets 1000; and a discovery information page 1400 generated by the discovery service 702 to return to the host nodes $102_1 \ldots 102_n$ to provide information on the virtual target storage resources the requesting host node may use to connect to the target systems $106_1 \ldots 106_m$. The virtual target configuration 1100 may contain information of all the virtual targets 1000, 1000' in the network 108, how each virtual target is configured, the NVMe targets systems $106_1 \ldots 106_m$ the virtual target is managing as well as the access permissions defined by the access control list $1200_D$.

The access control list $1200_D$ and virtual target configuration $1100_D$ may be configured by a system administrator that provisions storage resources in the target system (target subsystem/target controller/target namespace) by defining a virtual subsystems/virtual controllers/virtual namespace to configure in a virtual target 1000 that maps to target storage resources (physical or virtual) in a target system 106i. The host nodes $102_1 \ldots 102_n$ access the target system $106_i$ resources through the virtual target storage resources configured in the virtual target configuration $1100_D$ implemented in the virtual target 1000. A remote service 704 comprises a module and services to allow an administrator to login remotely to the distributed discovery service 702 for configuration, diagnosis, and other operations, such as configuring the access control list $1200_D$. The remote login may be from over the network 108.

Figure 8:
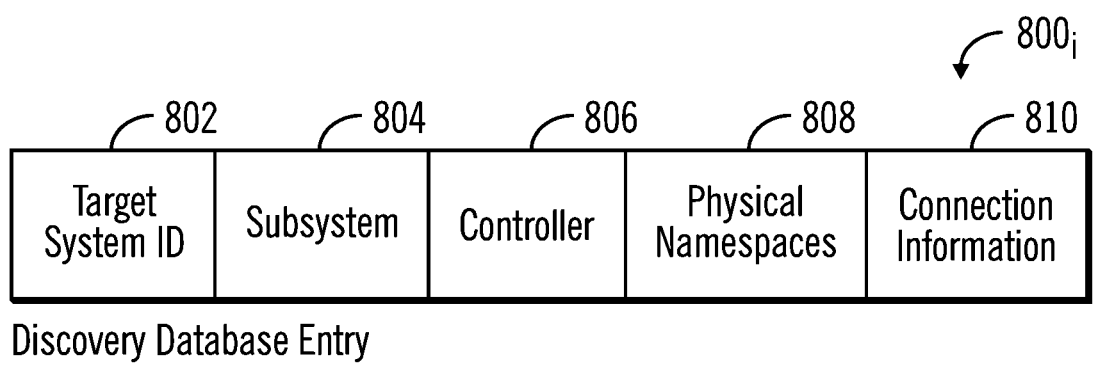
FIG. 8 illustrates an embodiment of a discovery database entry.

FIG. 8 illustrates an embodiment of a discovery database entry $800_i$ including a target system identifier (ID) 802 of a discovered target system $106_i$, a subsystem 804, controller 806 and physical or virtual namespaces 808 in the discovered target system 802, and connection information 810 required to communicate with the target system 802 and subsystem 804 over the network 108. A database entry $800_i$ may further include information on how a virtual namespace (e.g., VNSIDs $400_1, 400_2 \ldots 400_p$) maps to physical namespaces $120_1 \ldots 120_t$, which may be used by an administrator to configure the access control list $1200_D$.

Figure 9:
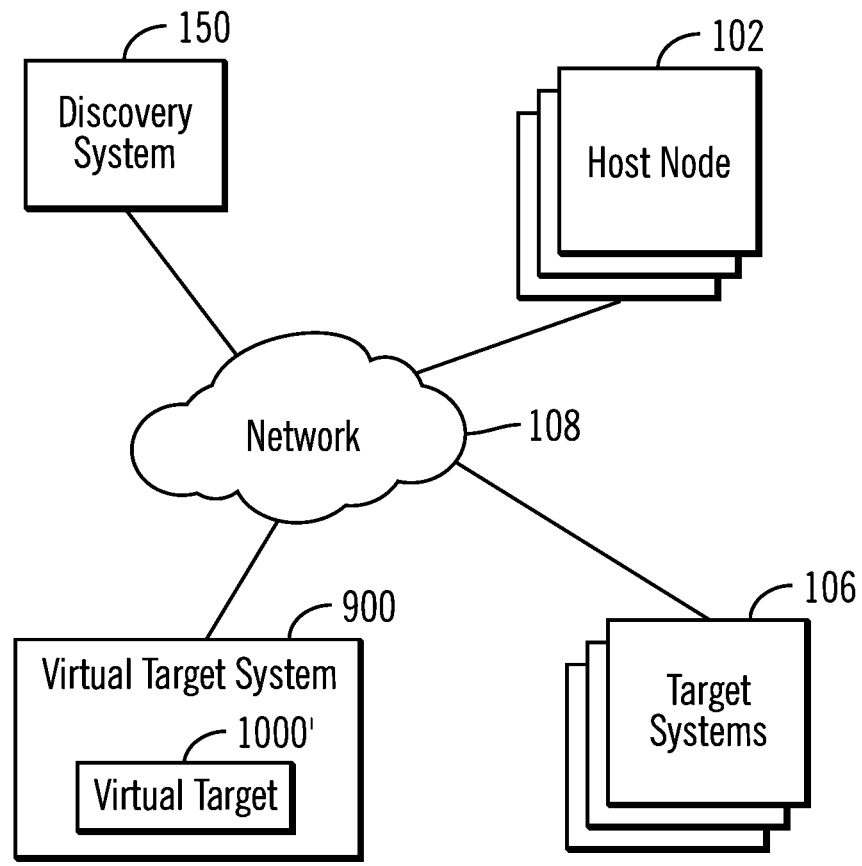
FIG. 9 illustrates an additional embodiment of a storage environment.

FIG. 9 illustrates an alternative embodiment of the storage environment of FIG. 1 as including host nodes 102, one or more discovery systems 150, target systems 106, and one or more virtual target systems 900 including a virtual target 1000'. The host nodes 102, discovery system 150, target systems 106, and virtual target 1000' may include the configuration as described with respect to the host nodes $102_1 \ldots 102_n$, discovery system 150, target systems $106_1 \ldots 106_m$, and virtual target 1000 of FIG. 1, respectively.

However, in the embodiments of FIG. 9, the virtual target 1000' is maintained in the virtual target system 900 (virtual or physical) separate from the target systems 106 and may manage virtual resources assigned to the host nodes 102 that map to storage resources in multiple target systems 106. There may be multiple virtual targets 1000' in the network that each manage access to multiple target systems 106.

Figure 10:
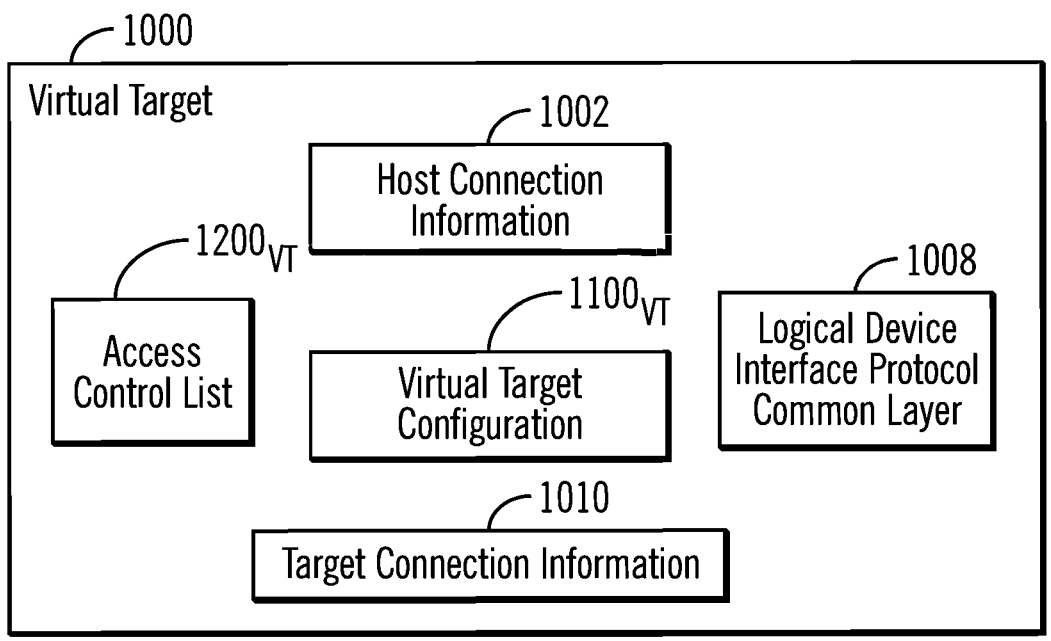
FIG. 10 illustrates an embodiment of a virtual target.

FIG. 10 illustrates an embodiment of the components in a virtual target 1000, including virtual target 1000', including host connection information 1002 providing information to connect to the host nodes $102_1 \ldots 102_n$, an access control list $1200_{VT}$ providing information on the virtual target storage resources in the virtual target 1000 the host nodes may access, where the access control list $1200_{VT}$ may comprise a subset of the entries $1200_i$ in the access control list $1200_D$ at the distributed discovery services 700, which provides access to all host nodes provisioned resources at the target systems; virtual target configuration $1100_{VT}$ providing the mapping of virtual target storage resources to target storage resources in one or more target systems $106_i$, which may be the target system including the virtual target 1000 or target systems 106 external to the virtual target 1000'; a logical device interface protocol 1008, which is the same as the protocols 112a, 112b, 112c, 112d; and target connection information 1010 to authenticate and communicate with the subsystems $200_1 \ldots 200_n$ (virtual or physical) configured in one or more target systems $106_1 \ldots 106_m$. For instance, a virtual target 1000 embedded within a target system $106_i$ may only include connection information to communicate with the subsystems $200_1 \ldots 200_n$ in the target $106_i$ in which it is included (as shown in FIG. 1) or may include target connection information 1010 for multiple connected target systems $106_1 \ldots 106_m$ when the virtual target 1000' is external to the target systems $106_1 \ldots 106_m$ (as shown in FIG. 9).

Figure 11:
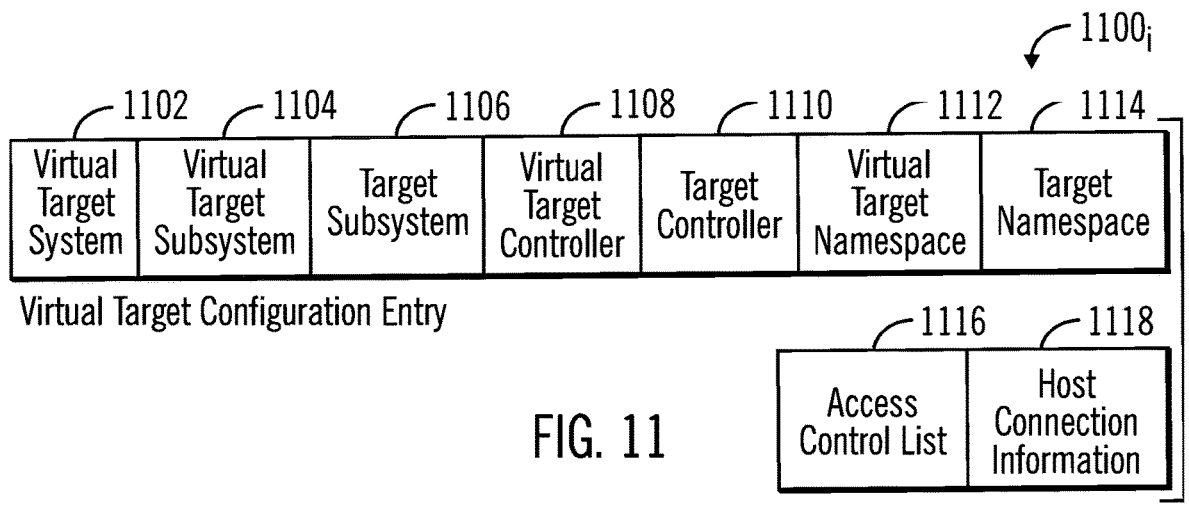
FIG. 11 illustrates an embodiment of a virtual target configuration entry.

FIG. 11 illustrates an embodiment of a virtual target configuration entry $1100_i$ in the virtual target configuration $1100_{VT}$ in a virtual target 1000 or the virtual target configuration $1100_D$ in the distributed discovery services 700 of virtual target storage resources configured in virtual targets 1000, 1000'. The entry $1100_i$ includes a virtual target system 1102 identifier or address of a virtual target 1000 that is within a target systems $106_1 \ldots 106_m$ or external 1000' to target systems; a virtual target subsystem 1104 configured in the virtual target 1102 that maps to a target subsystem 1106 in the target system 106i; a virtual target controller 1108 configured in the virtual target 1102 that maps to a target controller 1110 within the target subsystem 1106; and a virtual target namespace 1112 configured in the virtual target system 1102 that maps to a target namespace 1114 managed by the target controller 1110. The target subsystem 1106, controller 1106, and namespace 114 may comprise physical or virtual resources. Certain of the described information, such as fields 1112, 1114, and others may not be included in the configuration entry $1100_i$, as well as additional information may be provided in further embodiments.

Figure 12:
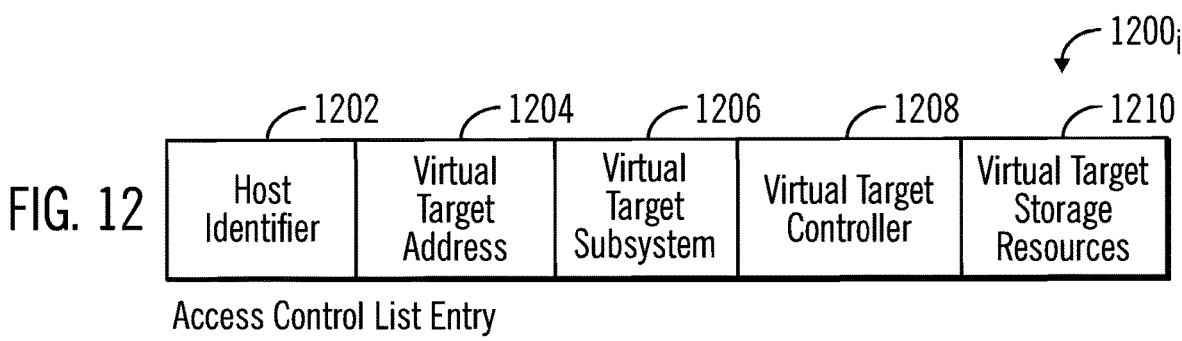
FIG. 12 illustrates an access control list entry.

FIG. 12 illustrates an embodiment of an access control list entry $1200_i$ in the access control list $1200_D$ maintained at the distributed discovery services 700, or at a virtual target $1200_{VT}$, and includes: a host identifier 1202 of one or more host nodes $102_1 \ldots 102_n$ that may access the enumerated resources; a virtual target address 1204 of the virtual target 1000, 1000' configured with the virtual target storage resources assigned to the host $120_2$, including a virtual target subsystem 1206, a virtual target controller 1208, and virtual target storage resources 1210, such as virtual namespaces that map to a target system subsystem/controller/namespace (virtual or physical). The access control list entry $1200_i$ may alternatively identify a class of hosts and storage resources of hosts that may access storage resources. The access control list $1200_D$ at the distributed discovery services 700 may maintain access control entries $1200_i$ for all connected host nodes $102_1 \ldots 102_n$ across all subsystems. The access control list $1200_{VT}$ at the virtual target 1000, 1000' may comprise a subset of the distributed discovery services access control list $1200_D$, having access control entries $1200_i$ for the virtual target storage resources at the identified virtual target 1204.

The virtual target configuration $1100_D$ and the access control list $1200_D$ may be generated by an administrator of the distributed discovery services 700 that would configure such information for host access to target system $106_1 \ldots 106_m$ storage resources.

Figure 13:
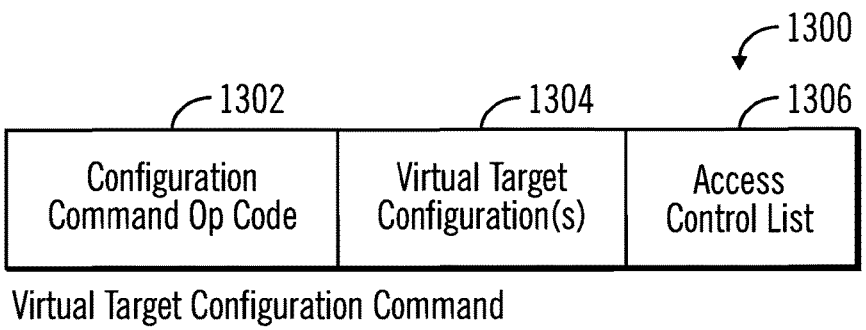
FIG. 13 illustrates an embodiment of a virtual target configuration command.

FIG. 13 illustrates an embodiment of a virtual target configuration command 1300 the distributed discovery services 700 would send to a virtual target 1000, 1000' to configure virtual target storage resources for use by a host indicated in the access control list entries $1200_i$ for the host nodes $102_1 \ldots 102_n$ allocated the virtual target storage resources. The command 1300 includes a configuration command operation code 1302, a virtual target configuration 1304, such as shown in FIG. 11, that provides a mapping of virtual target storage resources (virtual target subsystem/virtual target controller/virtual target storage resources) to configure in the virtual target 1000, 1000', and an access control list 1306, such as entries $1200_i$, for the host nodes $102_1 \ldots 102_n$ assigned access to the virtual target storage resources to configure.

The virtual target configuration command 1300 may further include configuration options for configuring the target storage resources, such as a specified Redundant Array of Independent Disk (RAID) configuration, e.g., RAID 0, RAID 5, RAID 11, etc., a Just a Bunch of Disk (JBOD) configuration and other possible storage configurations.

Figure 14:
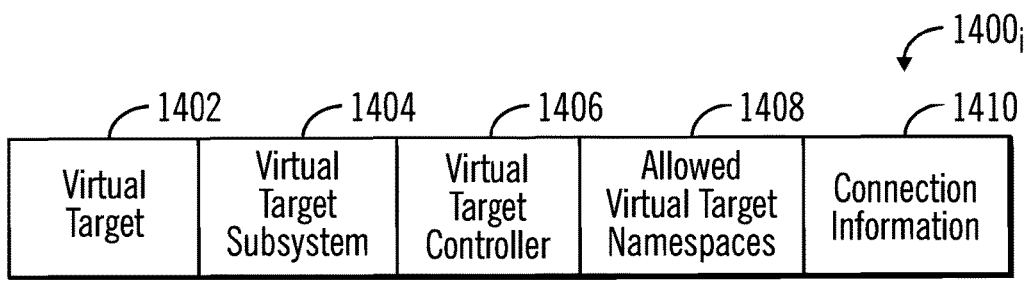
FIG. 14 illustrates an embodiment of a discovery page entry.

FIG. 14 illustrates an embodiment of a discovery page entry $1400_i$ having an instance of virtual target storage resources for which the discovery information page 1400 is generated, and includes a virtual target 1402, e.g., address or identifier; a virtual target subsystem 1404; virtual target controller 1406 and allowed virtual target namespaces 1408 (virtual or physical) the host can access through the virtual target subsystem 1404, and controller 1406. The discovery page entry $1400_i$ further provides connection information 1410 needed to connect to the virtual target 1402, such as a port, network address, etc. The host nodes $102_1 \ldots 102_n$ upon receiving a discovery information page 1400 may then access the target storage resources that map to the virtual target storage resources 1404/1406/1408 indicated in the entries $1400_i$ in the discovery information page 1400.

Figure 15:
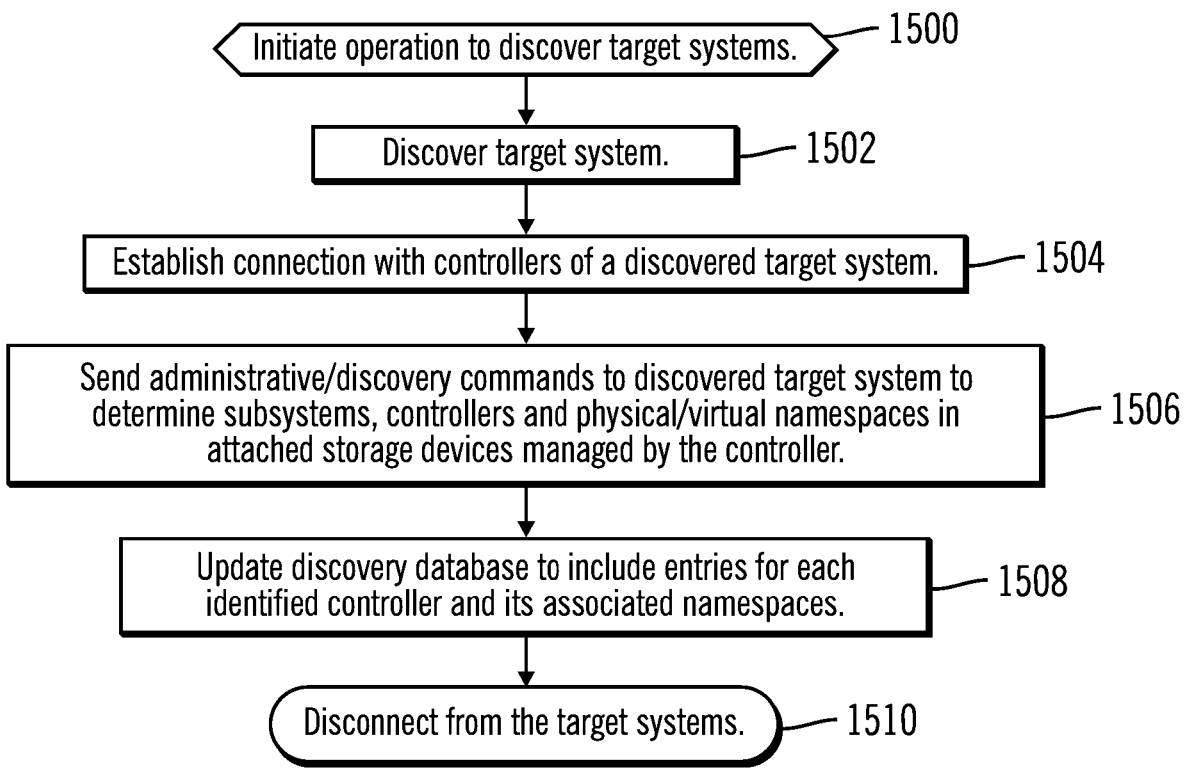
FIG. 15 illustrates an embodiment of operations to discover target systems.

FIG. 15 illustrates an embodiment of operations performed by the discovery service 702 to discover target systems $106_1 \ldots 106_m$ and include information on discovered target systems $106_1 \ldots 106_m$ in the discovery database 800. The target storage resources, e.g., NVMe subsystems 200, NVMe controllers 300, and namespaces 400, may be configured in the target systems $106_1 \ldots 106_m$ when the target systems $106_1 \ldots 106_m$ are initialized or before the discovery operations of FIG. 15, so that target storage resources are configured and available for discovery. Additionally, the discovery service 702 may configure additional target storage resources 200, 300, 400 in the target systems $106_1 \ldots 106_m$ as needed to make available to host nodes $102_1 \ldots 102_n$. At block 1500, the discovery service 702 initiates discovery operations and discovers (at block 1502) target systems $106_1 \ldots 106_m$. Target systems $106_1 \ldots 106_m$ may be discovered in response to notification from a target system $106_i$ when it becomes available in the network 108 or by the discovery service 702 broadcasting a discovery request in the network 108 to request target systems $106_1 \ldots 106_m$ to respond. The discovery service 702 may establish (at block 1504) a connection with the controllers $300_1 \ldots 300_t$ (virtual and physical) in a discovered target system 106i. In NVMe implementations, the discovery service 702 may connect to the controllers $300_1 \ldots 300_t$ administrative queue using Fabric layer protocols 114b, 114c. The discovery service 702 may then send (at block 1506) administrative/discovery commands (e.g., identify commands) to the discovered target system $106_i$ to determine information on subsystems $200_i$, controllers $300_i$ and namespaces (VNSID $400_i$, $400_2 \ldots 400_p$ or physical $120_1 \ldots 120_t$) in attached storage devices $104_i$ managed by the controller. The discovery service 702 updates (at block 1508) the discovery database 800 to include entries $900_i$ for each identified controller and its associated namespaces (virtual or physical). The discovery service 702 may disconnect (at block 1510) from the target system $106_i$ after gathering the information to update the discovery database 800.

Figure 16:
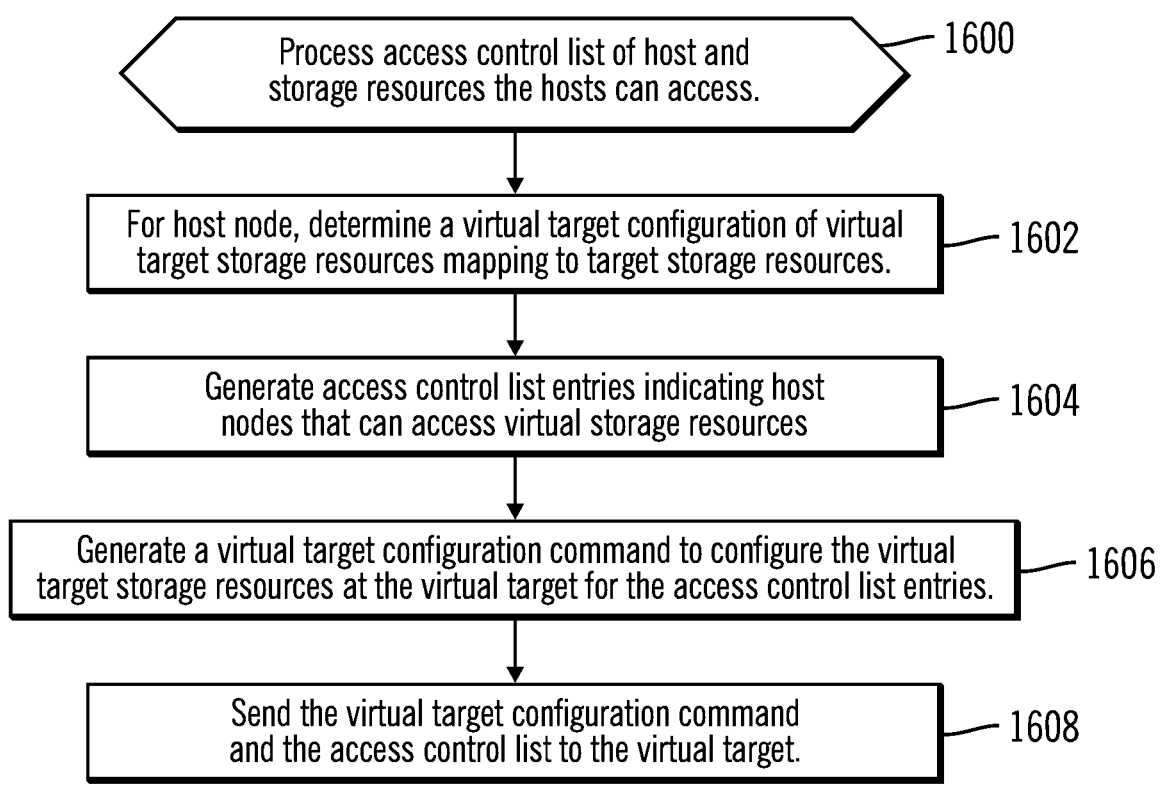
FIG. 16 illustrates an embodiment of operations to process an access control list.

FIG. 16 illustrates an embodiment of operations performed by the discovery service 702 to manage the access control list $1200_D$ at the distributed discovery services 700. Upon processing (at block 1600) the access control list $1200_D$ of host and storage resources the hosts can access, the discovery service 702 determines (at block 1602), for one or more host nodes $102_1 \ldots 102n$, a virtual target configuration $1100_i$ of virtual target storage resources 1104, 1108, 1112 that map to target storage resources 1106, 1110, 1114 the host may access. The discovery service 702 generates (at block 1604) access control list entries $1200_i$ indicating host nodes $120_2$ that can access the indicated virtual target storage resources 1206, 1208, 1210, which may have been configured in the target systems $106_1 \ldots 106_m$ before the discovery process. The discovery service 702 generates (at block 1606) a virtual target configuration command 1300 to configure the virtual target storage resources at the virtual target 1000, 1000' for the access control list entries $1200_i$. The discovery service 702 sends (at block 1608) the virtual target configuration command 1300 and the access control list entries $1200_i$ to the virtual target 1000, 1000', which may comprise the virtual target 1000 embedded in the target system $106_i$ having the target storage resources to which the virtual target resources map or a virtual target 1000' external to the target system $106_i$, which manages virtual target storage resources mapping to multiple target systems 106.

Figure 17:
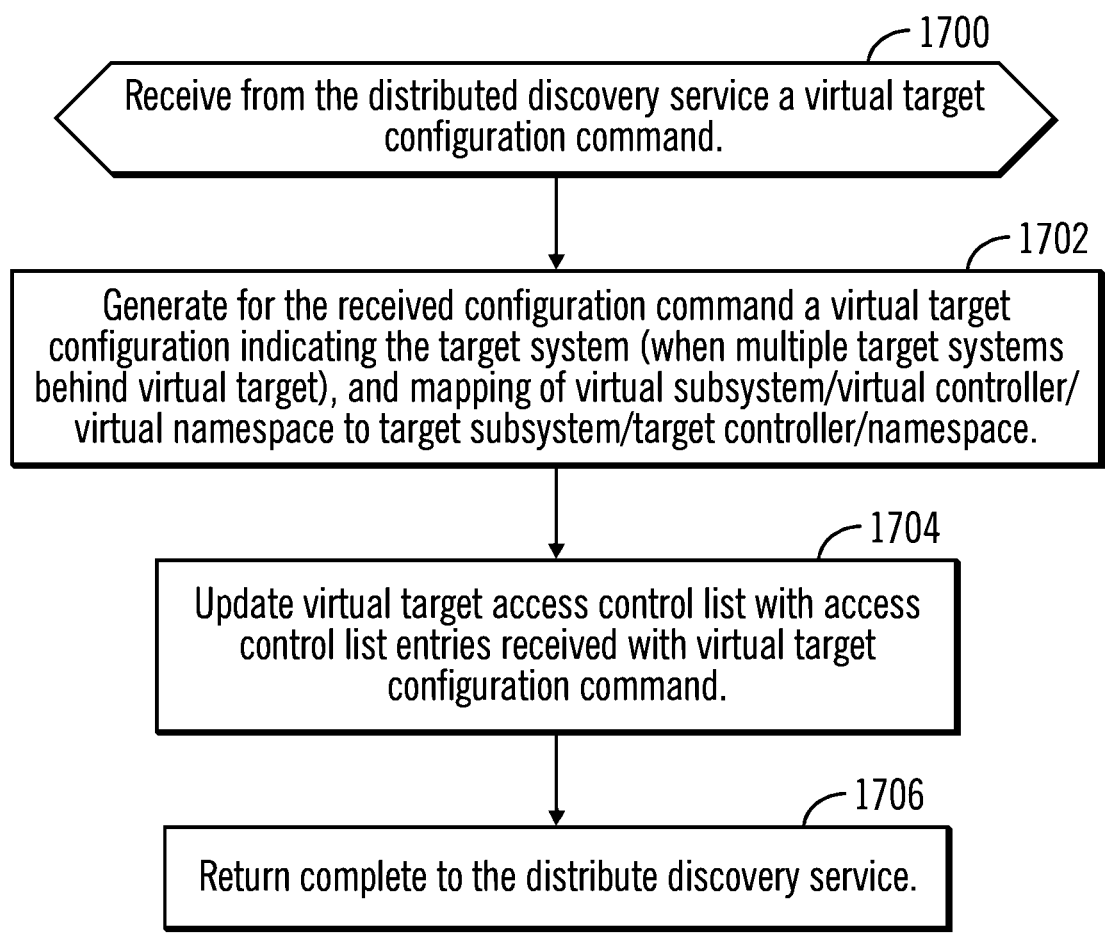
FIG. 17 illustrates an embodiment of operations for a virtual target to process a virtual target configuration command.

FIG. 17 illustrates an embodiment of operations performed by a virtual target 1000, 1000' to process the virtual target configuration command 1300. Upon receiving (at block 1700) from the distributed discovery service 700 a virtual target configuration command 1300, the virtual target 1000, 1000' generates (at block 1702) a virtual target configuration $1100_i$ to indicate the target subsystem 1106, when the virtual target 1000' manages access to multiple target systems 106 (FIG. 9), and the mapping of the virtual target storage resources 1104, 1108, 1112 to target storage resources 1106, 1110, 1114 (virtual or physical) at the target system $106_i$. The virtual target 1000, 1000' updates (at block 1704) the virtual target access control list $1200_{VT}$ received with the access control list entries $1200_i$ included in the virtual target configuration command 1300. Complete is then returned (at block 1706) to the distributed discovery services 700.

Figure 18:
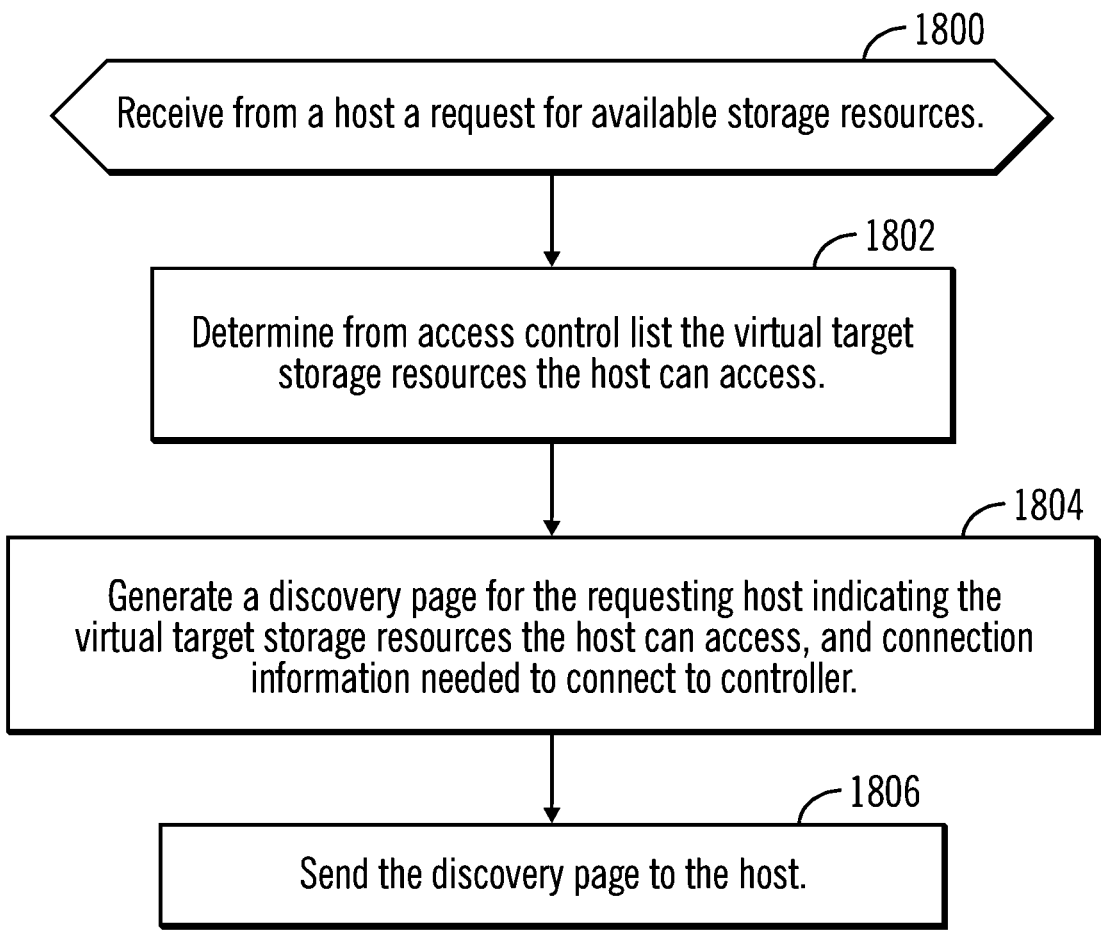
FIG. 18 illustrates an embodiment of operations for distributed discovery services to process a host request for available storage resources.

FIG. 18 illustrates an embodiment of operations performed by the discovery service 702 to process a request from a host node $102_1 \ldots 102_n$ for available storage resources the host can access. In certain embodiments, the discovery service 702 may notify the host nodes $102_1 \ldots 102_n$ to re-issue a request for available target storage resources when new target storage resources and virtual targets 1000, 1000' become available in the network 108 to provide the hosts opportunity to access. Upon receiving (at block 1800) the host request, the discovery service 702 determines (at block 1802) from the access control list $1200_D$ the virtual target storage resources 1204, 1206, 1208 the host can access, from the access control list entries $1200_i$ for the requesting host 1202. A discovery page 1400 is generated (at block 1804) including entries $1400_i$ indicating the virtual target storage resources 1204, 1206, 1208 the host can access in fields 1404, 1406, 1408 in the virtual target 1402, and the connection information 1410 to access the virtual target storage resources. The generated discovery page 1400 is sent (at block 1806) to the requesting host node $102i$. The host $102_i$ may disconnect from the discovery service 700 upon receiving all discovery page entries $1400_i$ in one or more discovery information pages 1400.

Figure 19:
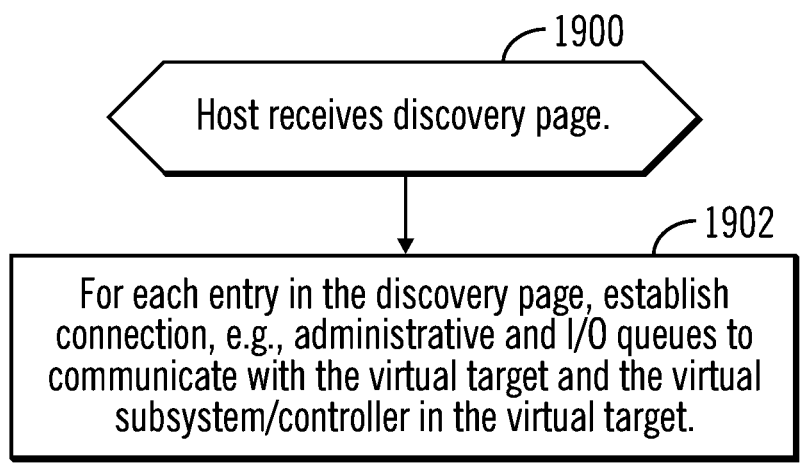
FIG. 19 illustrates an embodiment of operation for a host to process a received discovery page.

FIG. 19 illustrates an embodiment of operations performed by a host node $102_i$ to process a received discovery page 1400 from the distributed discovery service 700. Upon receiving the discovery page 1400, for each entry $1400_i$ in the discovery page 1400, the host node $102_i$ establishes (at block 1402) a connection with the virtual target 1402 using the connection information 1410 in the discovery page entry $1400_i$. In NVMe embodiments, the host node $102_i$ may use a connect command to create an administrative (admin) queue to provide an association between the virtual target 1402 and the virtual target storage resources 1404, 1406, 1408 to establish the connection. Once the connection is established, the host node $102_i$ may send Input/Output (I/O) requests to the controller to access the namespaces allowed virtual target namespaces 1408, assigned in the discovery page 1400, which map to target storage resources 1106, 1110, 1114 in the virtual target configuration $1100_{VT}$ at the virtual target 1000, 1000'. In NVMe embodiments, the host node $102_i$ may further send administrative commands to establish the connection. In this way, the host node $102_i$ directly connects to the virtual target and virtual target storage resources upon receiving the discovery page 1500 independent of the distributed discovery service 700.

Figure 20:
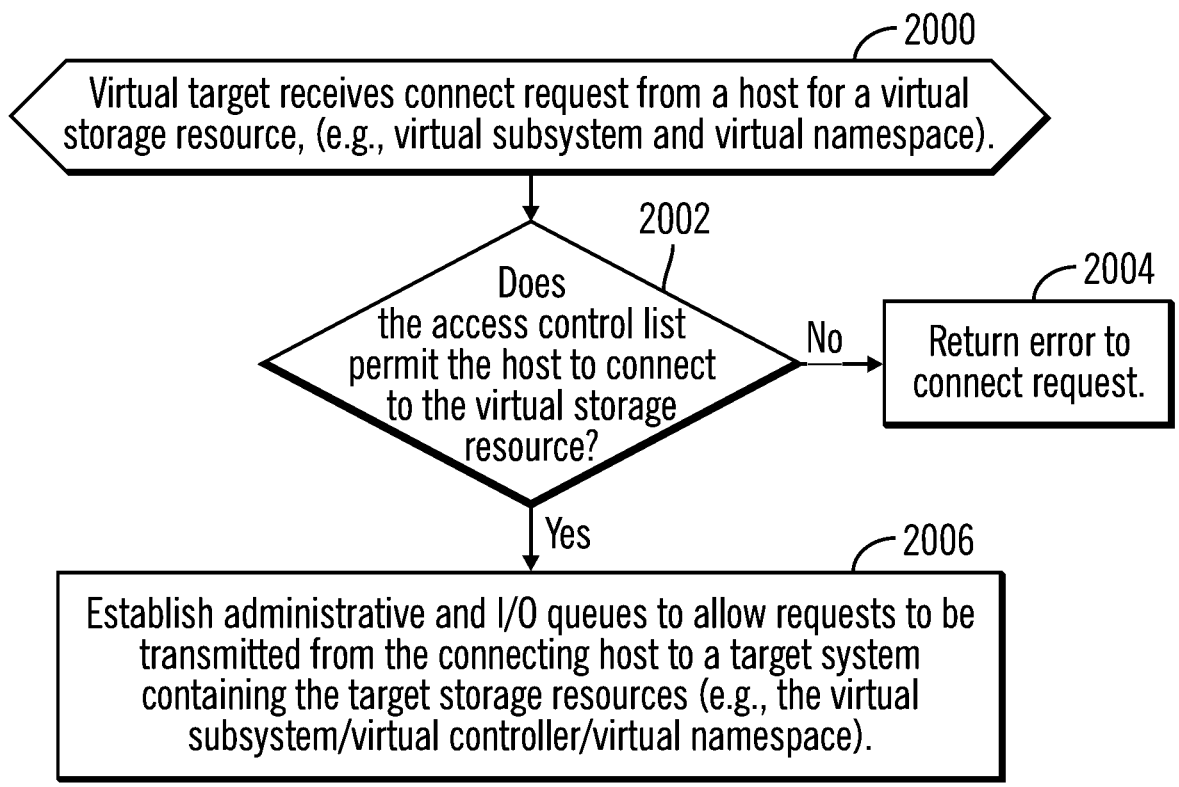
FIG. 20 illustrates an embodiment of operations for a virtual target to process a connect request from a host.

FIG. 20 illustrates an embodiment of operations performed by the virtual target 1000, 1000' to establish a connection with a host node $102_i$ to access a virtual target storage resource. Upon receiving (at block 2000) the connect request for a virtual target storage resource, the virtual target 1000, 1000' determines (at block 2002) whether the access control list $1200_{VT}$ includes an entry 1200 indicating that the requesting host is permitted to access the requested virtual target storage resource, i.e., the requested virtual target storage resource matches the virtual target storage resources 1206, 1208, 1210 indicated in one of the access control list entries $1200_1$. If (at block 2002) the virtual target access control list $1200_{VT}$ does not indicate the requesting host $102_i$ can access the requested virtual target storage resource, then an error is returned (at block 2004) to the connect request that the connection is denied. If (at block 2002) the access control list $1200_{VT}$ indicates the requesting host can access the specified storage resource, then the virtual target 1000, 1000' allows (at block 2006) the connect request to complete, and establishes any administrative and I/O queues to allow requests to be transmitted from the connecting host nodes $102_1 \ldots 102_n$ to a target system $106_1 \ldots 106_m$ containing the target storage resources (e.g., the virtual subsystem 200/virtual controller 300/virtual namespace 400). In this way, FIG. 20 illustrates an embodiment of operations for a virtual target 1000, 1000' to address the situation where a requesting host $102_i$ attempts to connect to virtual target storage resources that the host has not been provisioned to access.

Figure 21:
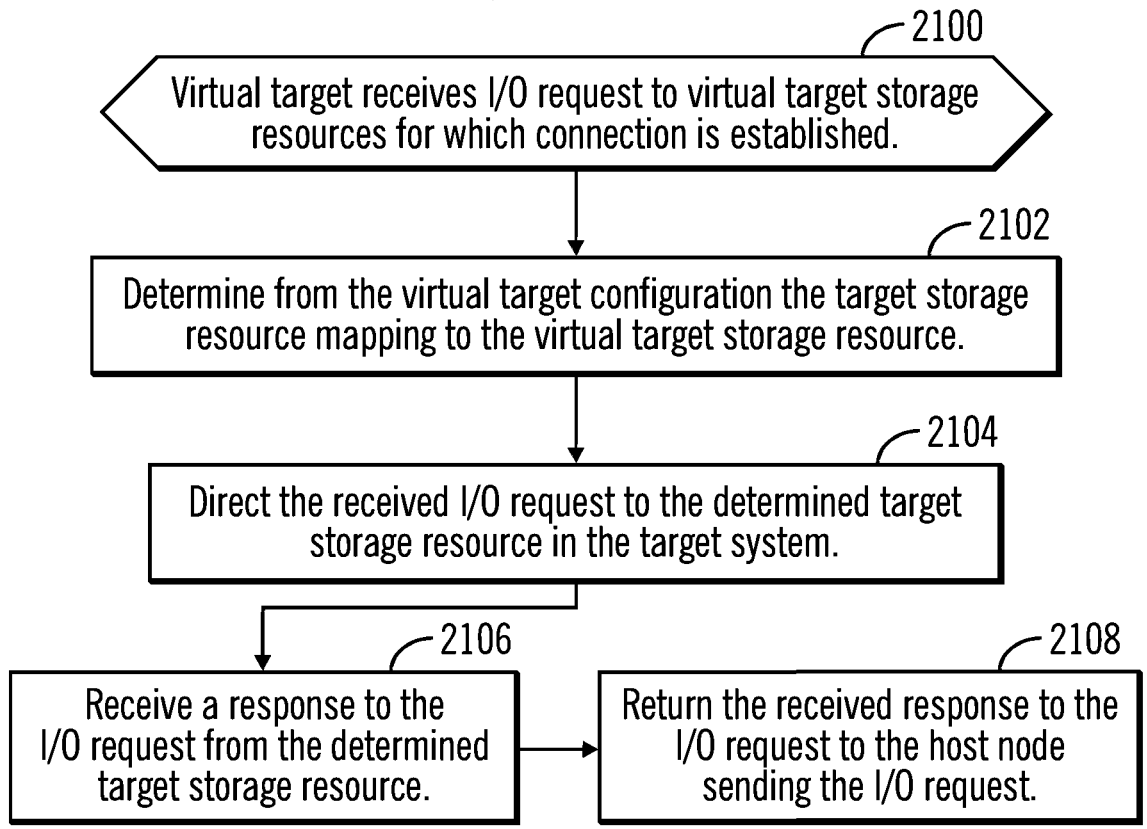
FIG. 21 illustrates an embodiment of operations for a virtual target to process an I/O request.

FIG. 21 illustrates an embodiment of operations performed by the virtual target 1000, 1000' to process an I/O request from a connected host $102i$. Upon receiving (at block 2100) an I/O request to a virtual target storage resource, e.g., virtual target storage subsystem/virtual target storage controller/virtual target storage namespace, the virtual target 1000, 1000' determines (at block 2102) from the virtual target configuration $1100_{VT}$ the target storage resource 1106, 1110, 1114 mapping to the received virtual target storage resource 1104, 1108, 1112. The virtual target 1000, 1000' directs (at block 2104) the received I/O request, which may comprise an NVMe request, to the determined target storage resource in the target system $106_i$ having the resource. When the target system $106_i$ is external to the virtual target 1000', such as in FIG. 9, then the virtual target 1000' communicates the NVMe request to the target system 106 over the network 108. Otherwise, when the virtual target 1000 is embedded in the target system $106_i$, then the virtual target 1000 communicates the I/O request to the target storage resources over a bus in the target system $106_i$ or through program calls when the target storage resources comprise virtual resources. Upon receiving (at block 2106) the response to the I/O request from the determined target storage resource, the virtual target 1000, 1000' returns (at block 2108) the received response to the I/O request to the host node $102_i$ sending the request.

With the described embodiments, a distributed discovery service interfaces between virtual targets and hosts to provide discovery services to the host for storage resources, such as virtual and physical namespaces, in the target system through a virtual target. The virtual target may provide virtual target storage resources for the hosts to access that map to the target storage resources in the target system. The distributed discovery services and virtual target use an access control list to limit host access to virtual target storage resources that map to the target storage resources in the target systems. Further, the hosts establish connections to the distributed discovery service based on fabric configuration and target clustering to discover allocated storage resources.

The described operations of the processing components, such as components 112a, 112b, 112c, 112d, 114a, 114b, 114c, 114d, 132, 138, 700, 702, 1000, 1000' and other components, may be implemented as a method, apparatus, device, computer product comprising a computer readable storage medium using standard programming and/or engineering techniques to produce software, firmware, hardware, or any combination thereof. The described operations may be implemented as code or logic maintained in a "computer readable storage medium". The term "code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes physical and tangible components. Those skilled in the art will recognize that many modifications may be made to this configuration without departing from the scope of the present invention, and that the article of manufacture may comprise suitable information bearing medium known in the art.

Figure 22:
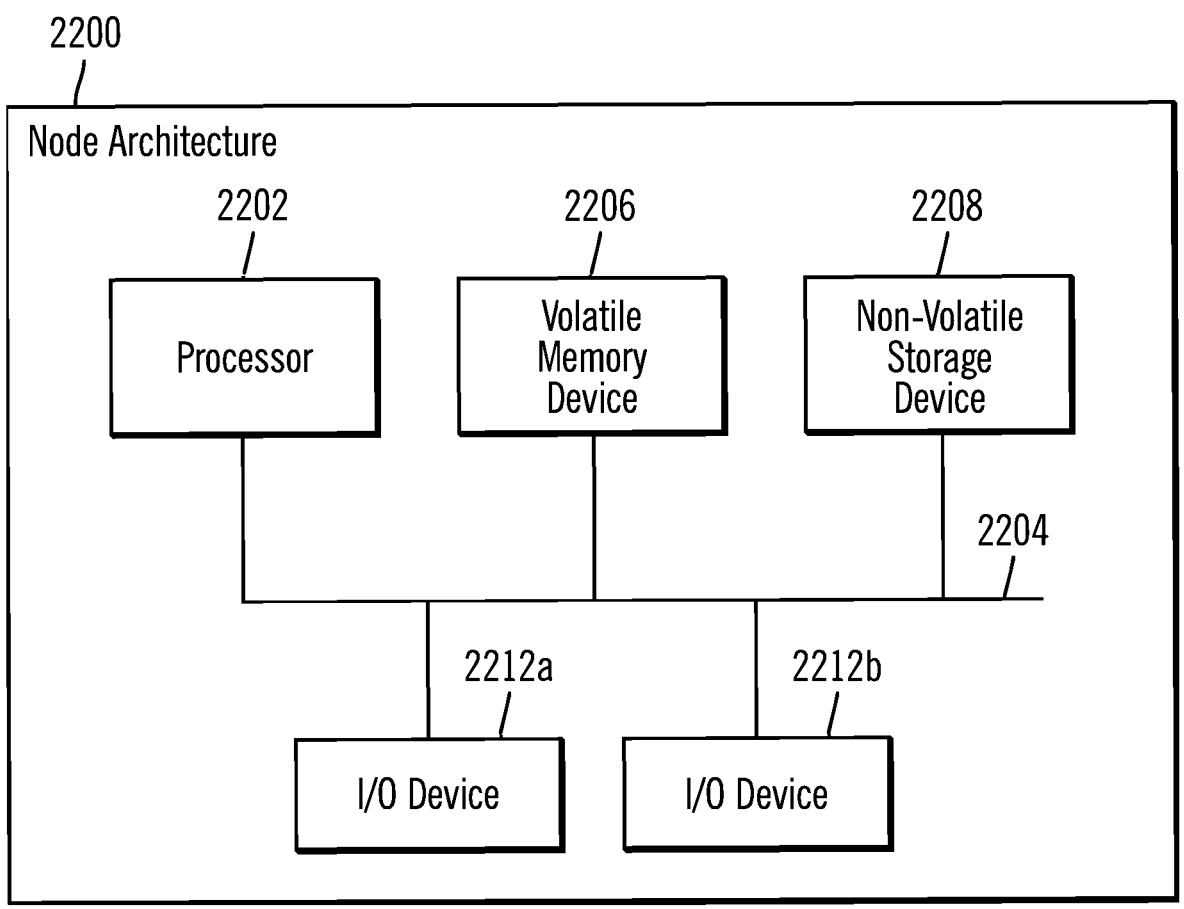
FIG. 22 illustrates an embodiment of a computer node architecture in which components may be implemented

FIG. 22 illustrates an embodiment of a computer node architecture 2200, such as the components included in the host nodes $102_1$, $102_2$ . . . $102_n$, the target systems $106_1$ . . . $106_m$, the discovery system 150, and the virtual target system 900, including a processor 2202 that communicates over a bus 2204 with a volatile memory device 2206 in which programs, operands and parameters being executed are cached, and a non-volatile storage device 2204, such as target system memory 136. The bus 2204 may comprise multiple buses. Further, the bus 2204 may comprise a multi-agent bus or not be a multi-agent bus, and instead provide point-to-point connections according to PCIe architecture. The processor 2202 may also communicate with Input/output (I/O) devices 2212a, 2212b, which may comprise input devices, display devices, graphics cards, ports, network interfaces, etc. For the host nodes $102_1$, $102_2$ . . . $102_n$ and the discovery system 150, the virtual storage resources may also appear on the bus 1004 as bus components.

In certain embodiments, the computer node architecture 2200 may comprise a personal computer, server, mobile device or embedded compute device. In a silicon-on-chip (SOC) implementation, the architecture 2200 may be implemented in an integrated circuit die. In certain implementations, the architecture 2200 may not include a PCIe bus to connect to NVMe storage devices, and instead include a network adaptor to connect to a fabric or network and send communications using the NVMe interface to communicate with the target systems $106_1$ . . . $106_m$ to access underlying storage devices $104_1$ . . . $104_m$.

The described data structures and information in FIGS. 2-5, 8, and 11-14 are provided by way of example, and in further embodiments, certain of the described information fields may not be included and information in addition to that described may be provided.

The reference characters used herein, such as i, j, m, n, p, and t are used to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following examples pertain to further embodiments.

Example 1 is a computer program product including a computer readable storage media in communication with host nodes and target systems over a network to provide a virtualization of target storage resources in a target system to provision to hosts, wherein the computer readable storage media includes program code executed by at least one processor, comprising: discovery service code executed to: discover target storage resources available at a target system over the network; determine a configuration of virtual target storage resources mapping to the target storage resources for one of the host nodes; register, with a virtual target, the configuration of the virtual target storage resources mapping to the target storage resources at the target system and an access control list of the host node allowed to access the virtual target storage resources; receive a query from a requesting host node comprising one of the host nodes for the target storage resources the host node is permitted to access according to the access control list; and return host discovery information to the requesting host node indicating the virtual target storage resources the requesting host node is provisioned to access from the virtual target.

In Example 2, the subject matter of examples 1 and 3-12 can optionally include the virtual target code of the virtual target executed to: receive a request from one of the host nodes to establish a connection with a requested virtual target storage resource configured in the virtual target; determine from the access control list whether the requesting host node is authorized to access the requested virtual target storage resource; and communicating with the requesting host node to establish a connection with the requested virtual target to access the requested virtual target storage resource.

In Example 3, the subject matter of examples 1, 2, and 4-12 can optionally include the virtual target code of the virtual target executed to receive an Input/Output (I/O) request from one of the host nodes to access one of the virtual target storage resources; determine, from the configuration, the target storage resource in the target system mapping to the virtual target storage resource to access; direct the received I/O request to the determined target storage resource in the target system; receive a response to the I/O request from the determined target storage resource; and returning the received response to the I/O request to the host node sending the I/O request.

In Example 4, the subject matter of examples 1-3 and 5-12 can optionally include that the virtual target is implemented in the target system having the target storage resources, wherein the discovery service code is further executed to: discover additional target storage resources available in at least one additional target system over the network; and for each of the at least one additional target system: determine a configuration of additional virtual target storage resources to additional target storage resources in the additional target system to which at least one host node is assigned to access in an additional access control lists; and register, with an additional virtual target in the additional target system, the configuration of the additional virtual target storage resources mapping to the additional target storage resources at the additional target system and the additional access control list of the at least one host node allowed to access the additional virtual target storage resources.

In Example 5, the subject matter of examples 1-4 and 6-12 can optionally include that the virtual target is implemented in a virtual target system connected to the target system having the target storage resources over the network, and wherein the virtual target system is external to the target system over the network.

In Example 6, the subject matter of examples 1-5 and 7-12 can optionally include that the virtual target system is connected over the network to at least one additional target system having additional target storage resources, wherein the discovery service code is further executed to: discover, over the network, the additional target storage resources available at the target systems over the network; and for each of the at least one additional target system: determine a configuration of additional virtual target storage resources mapping to the additional target storage resources at the additional target system for at least on one of the host nodes; and register, with the virtual target, the configuration of the additional virtual target storage resources mapping to the additional target storage resources at the additional target system and an additional access control list of the at least one host node allowed to access the additional virtual target storage resources.

In Example 7, the subject matter of examples 1-6 and 8-12 can optionally include virtual target code of the virtual target executed to: receive an Input/Output (I/O) request from one of the host nodes to access one of the virtual target storage resources; determine, from the configuration, the target storage resource in one of the target systems mapping to the virtual target storage resource to access; and communicate, with the target system including the determined target storage resource, the received I/O request to the determined target storage resource in the target system.

In Example 8, the subject matter of examples 1-7 and 9-12 can optionally include the discover the target storage resources available at the target systems comprises: send queries to the target systems to obtain information on controllers configured in the target systems and the target storage resources managed by the controllers; and update a discovery database having information on the target storage resources and their controllers in the target systems with information on the controllers and the target storage resources returned in response to the queries and with connection information to access the controllers in the target systems to access the target storage resources, wherein the controllers manage access to the target storage resources, wherein the host discovery information returned to the requesting host node includes information on virtual controllers and virtual target resources that map to the controllers and storage resources the requesting host node is provisioned to access indicated in the discovery database.

In Example 9, the subject matter of examples 1-8 and 10-12 can optionally include that the virtual target storage resources registered with the virtual target comprise a virtual target subsystem, virtual target controller, and virtual target namespace that maps to a storage subsystem, controller, and a namespace representing physical storage space managed by the controller at the target system.

In Example 10, the subject matter of examples 1-9 and 11-12 can optionally include that the storage subsystem, controller, and namespace in the target system to which the virtual target subsystem, virtual target controller, and virtual target namespace maps comprises a target virtual subsystem, a target virtual controller, and target virtual namespace.

In Example 11, the subject matter of examples 1-10 and 12 can optionally include that the discovery service code is implemented in a discovery subsystem, and wherein the target systems, the host nodes, and the discovery subsystem implement a logical device interface protocol to establish connections and communicate read and write requests and implement a fabric protocol to communicate over a network.

In Example 12, the subject matter of examples 1-11 can optionally include that the logical device interface protocol comprises a Non-volatile Memory Express (NVMe) protocol, wherein the target system comprises a storage device having a storage medium, wherein at least one NVMe subsystem and at least one NVMe controller are implemented in the storage device to manage a mapping of physical namespaces to ranges of addresses in the storage device.

Example 13 is a system in communication with host nodes, target systems and a virtual target over a network to provide a virtualization of target storage resources in a target system to provision to hosts, comprising: a processor; and a computer readable storage medium having discovery service code executed by the processor to: discover target storage resources available at the target systems over the network; determine a configuration of virtual target storage resources mapping to the target storage resources for one of the host nodes; register, with the virtual target, the configuration of the virtual target storage resources mapping to the target storage resources at the target system and an access control list of the host node allowed to access the virtual target storage resources; receive a query from a requesting host node comprising one of the host nodes for the target storage resources the host node is permitted to access according to the access control list; and return host discovery information to the requesting host node indicating the virtual target storage resources the requesting host node is provisioned to access from the virtual target.

In Example 14, the subject matter of examples 13 and 15-17 can optionally include that the virtual target is implemented in the target system having the target storage resources, wherein the discovery service code is further executed to: discover additional target storage resources available in at least one additional target system over the network; for each of the at least one additional target system: determine a configuration of additional virtual target storage resources to additional target storage resources in the additional target system to which at least one host node is assigned to access in an additional access control lists; and register, with an additional virtual target in the additional target system, the configuration of the additional virtual target storage resources mapping to the additional target storage resources at the additional target system and the additional access control list of the at least one host node allowed to access the additional virtual target storage resources.

In Example 15, the subject matter of examples 13, 14, 16, and 17 can optionally include that the virtual target is implemented in a virtual target system connected, over the network, to the target system having the target storage resources, and wherein the virtual target system is external to the target system over the network.

In Example 16, the subject matter of examples 13-15 and 17 can optionally include that the virtual target system is connected over the network to at least one additional target system having additional target storage resources, wherein the discovery service code is further executed to: discover, over the network, the additional target storage resources available at the target systems; and for each of the at least one additional target system: determine a configuration of additional virtual target storage resources mapping to the additional target storage resources at the additional target system for at least on one of the host nodes; and register, with the virtual target, the configuration of the additional virtual target storage resources mapping to the additional target storage resources at the additional target system and an additional access control list of the at least one host node allowed to access the additional virtual target storage resources.

In Example 17, the subject matter of examples 13-16 can optionally include that the virtual target storage resources registered with the virtual target comprise a virtual target subsystem, virtual target controller, and virtual target namespace that maps to a storage subsystem, controller, and a namespace representing physical storage space managed by the controller at the target system.

Example 18 is a system in communication with host nodes, target systems and a discovery system over a network to provide a virtualization of target storage resources in a target system to provision to hosts, comprising: a processor; and a computer readable storage medium having virtual target code implementing a virtual target executed to: receive, from the discovery system, a configuration of virtual target storage resources at the virtual target mapping to target storage resources at one of the target systems and an access control list of one of the host nodes allowed to access the virtual target storage resources; receive a request from one of the host nodes to establish a connection with a requested virtual target storage resource comprising one of the virtual target resources indicted in the configuration; determine from the access control list whether the requesting host node is authorized to access the requested virtual target storage resource; and communicating with the requesting host node to establish a connection with the requested virtual target to access the requested virtual target storage resource.

In Example 19, the subject matter of example 18 can optionally include that the virtual target code of the virtual target is further executed to: receive an Input/Output (I/O) request from one of the host nodes to access one of the virtual target storage resources; determine, from the configuration, the target storage resource in the target system mapping to the virtual target storage resource to access; direct the received I/O request to the determined target storage resource in the target system; receive a response to the I/O request from the determined target storage resource; and returning the received response to the I/O request to the host node sending the I/O request.

Example 20 is a method for allocating target storage resources in target systems to host nodes over a network to provide a virtualization of target storage resources in a target system to provision to hosts, comprising: discovering target storage resources available at a target system over the network; determining a configuration of virtual target storage resources mapping to the target storage resources for one of the host nodes; registering, with a virtual target, the configuration of the virtual target storage resources mapping to the target storage resources at the target system and an access control list of the host node allowed to access the virtual target storage resources; receiving a query from a requesting host node comprising one of the host nodes for the target storage resources the host node is permitted to access according to the access control list; and returning host discovery information to the requesting host node indicating the virtual target storage resources the requesting host node is provisioned to access from the virtual target.

In Example 21, the subject matter of examples 20 and 21-25 can optionally include receiving, by the virtual target, a request from one of the host nodes to establish a connection with a requested virtual target storage resource configured in the virtual target; determining, by the virtual target, from the access control list whether the requesting host node is authorized to access the requested virtual target storage resource; and communicating, by the virtual target, with the requesting host node to establish a connection with the requested virtual target to access the requested virtual target storage resource.

In Example 22, the subject matter of examples 20, 21, and 23-25 can optionally include receiving, by the virtual target, an Input/Output (I/O) request from one of the host nodes to access one of the virtual target storage resources; determining, from the configuration, the target storage resource in the target system mapping to the virtual target storage resource to access; directing, by the virtual target, the received I/O request to the determined target storage resource in the target system; receiving, by the virtual target, a response to the I/O request from the determined target storage resource; and returning, by the virtual target, the received response to the I/O request to the host node sending the I/O request.

In Example 23, the subject matter of examples 20-22 and 24-25 can optionally include that the virtual target is implemented in the target system having the target storage resources, further comprising: discovering additional target storage resources available in at least one additional target system over the network; for each of the at least one additional target system: determining a configuration of additional virtual target storage resources to additional target storage resources in the additional target system to which at least one host node is assigned to access in an additional access control lists; and registering, with an additional virtual target in the additional target system, the configuration of the additional virtual target storage resources mapping to the additional target storage resources at the additional target system and the additional access control list of the at least one host node allowed to access the additional virtual target storage resources.

In Example 24, the subject matter of examples 20-23 and 25 can optionally include that the virtual target is implemented in a virtual target system connected to the target system having the target storage resources over the network, and wherein the virtual target system is external to the target system over the network.

In Example 25, the subject matter of examples 20-24 can optionally include that the virtual target system is connected over the network to at least one additional target system having additional target storage resources, further comprising: discovering, over the network, the additional target storage resources available at the target systems over the network; and for each of the at least one additional target system: determining a configuration of additional virtual target storage resources mapping to the additional target storage resources at the additional target system for at least on one of the host nodes; and registering, with the virtual target, the configuration of the additional virtual target storage resources mapping to the additional target storage resources at the additional target system and an additional access control list of the at least one host node allowed to access the additional virtual target storage resources.

Example 26 is an apparatus for allocating target storage resources in target systems to host nodes over a network to provide a virtualization of target storage resources in a target system to provision to hosts, comprising: means for discovering target storage resources available at a target system over the network; means for determining a configuration of virtual target storage resources mapping to the target storage resources for one of the host nodes; means for registering, with a virtual target, the configuration of the virtual target storage resources mapping to the target storage resources at the target system and an access control list of the host node allowed to access the virtual target storage resources; means for receiving a query from a requesting host node comprising one of the host nodes for the target storage resources the host node is permitted to access according to the access control list; and means for returning host discovery information to the requesting host node indicating the virtual target storage resources the requesting host node is provisioned to access from the virtual target.

Example 27 is an apparatus to provide a virtualization of target storage resources in a target system to provision to hosts, comprising: a discovery service to: discover target storage resources available at a target system over the network; determine a configuration of virtual target storage resources mapping to the target storage resources for one of the host nodes; register, with a virtual target, the configuration of the virtual target storage resources mapping to the target storage resources at the target system and an access control list of the host node allowed to access the virtual target storage resources; receive a query from a requesting host node comprising one of the host nodes for the target storage resources the host node is permitted to access according to the access control list; and return host discovery information to the requesting host node indicating the virtual target storage resources the requesting host node is provisioned to access from the virtual target.

In Example 28, the subject matter of examples 27 and 29-38 can optionally include that the virtual target is to: receive a request from one of the host nodes to establish a connection with a requested virtual target storage resource configured in the virtual target; determine from the access control list whether the requesting host node is authorized to access the requested virtual target storage resource; and communicating with the requesting host node to establish a connection with the requested virtual target to access the requested virtual target storage resource.

In Example 29, the subject matter of examples 27, 28 and 30-38 can optionally include virtual target code of the virtual target executed to: receive an Input/Output (I/O) request from one of the host nodes to access one of the virtual target storage resources; determine, from the configuration, the target storage resource in the target system mapping to the virtual target storage resource to access; direct the received I/O request to the determined target storage resource in the target system; receive a response to the I/O request from the determined target storage resource; and returning the received response to the I/O request to the host node sending the I/O request.

In Example 30, the subject matter of examples 27-29 and 31-38 can optionally include that the virtual target is implemented in the target system having the target storage resources, wherein the discovery service is further to: discover additional target storage resources available in at least one additional target system over the network; and for each of the at least one additional target system: determine a configuration of additional virtual target storage resources to additional target storage resources in the additional target system to which at least one host node is assigned to access in an additional access control lists; and register, with an additional virtual target in the additional target system, the configuration of the additional virtual target storage resources mapping to the additional target storage resources at the additional target system and the additional access control list of the at least one host node allowed to access the additional virtual target storage resources.

In Example 31, the subject matter of examples 27-30 and 32-38 can optionally include that the virtual target is implemented in a virtual target system connected to the target system having the target storage resources over the network, and wherein the virtual target system is external to the target system over the network.

In Example 32, the subject matter of examples 27-31 and 33-38 can optionally include that the virtual target system is connected over the network to at least one additional target system having additional target storage resources, wherein the discovery service is further to: discover, over the network, the additional target storage resources available at the target systems over the network; and for each of the at least one additional target system: determine a configuration of additional virtual target storage resources mapping to the additional target storage resources at the additional target system for at least on one of the host nodes; and register, with the virtual target, the configuration of the additional virtual target storage resources mapping to the additional target storage resources at the additional target system and an additional access control list of the at least one host node allowed to access the additional virtual target storage resources.

In Example 33, the subject matter of examples 27-32 and 34-38 can optionally include a virtual target to: receive an Input/Output (I/O) request from one of the host nodes to access one of the virtual target storage resources; determine, from the configuration, the target storage resource in one of the target systems mapping to the virtual target storage resource to access; and communicate, with the target system including the determined target storage resource, the received I/O request to the determined target storage resource in the target system.

In Example 34, the subject matter of examples 27-33 and 35-38 can optionally include that the discover the target storage resources available at the target systems comprises: send queries to the target systems to obtain information on controllers configured in the target systems and the target storage resources managed by the controllers; and update a discovery database having information on the target storage resources and their controllers in the target systems with information on the controllers and the target storage resources returned in response to the queries and with connection information to access the controllers in the target systems to access the target storage resources, wherein the controllers manage access to the target storage resources, wherein the host discovery information returned to the requesting host node includes information on virtual controllers and virtual target resources that map to the controllers and storage resources the requesting host node is provisioned to access indicated in the discovery database.

In Example 35, the subject matter of examples 27-34 and 36-38 can optionally include that the virtual target storage resources registered with the virtual target comprise a virtual target subsystem, virtual target controller, and virtual target namespace that maps to a storage subsystem, controller, and a namespace representing physical storage space managed by the controller at the target system.

In Example 36, the subject matter of examples 27-35 and 37-38 can optionally include that the storage subsystem, controller, and namespace in the target system to which the virtual target subsystem, virtual target controller, and virtual target namespace maps comprises a target virtual subsystem, a target virtual controller, and target virtual namespace.

In Example 37, the subject matter of examples 27-36 and 38 can optionally include that the discovery service code is implemented in a discovery subsystem, and wherein the target systems, the host nodes, and the discovery subsystem implement a logical device interface protocol to establish connections and communicate read and write requests and implement a fabric protocol to communicate over a network.

In Example 38, the subject matter of examples 27-37 can optionally include that the logical device interface protocol comprises a Non-volatile Memory Express (NVMe) protocol, wherein the target system comprises a storage device having a storage medium, wherein at least one NVMe subsystem and at least one NVMe controller are implemented in the storage device to manage a mapping of physical namespaces to ranges of addresses in the storage device.

Example 39 is system in communication with host nodes, target systems and a virtual target over a network to provide a virtualization of target storage resources in a target system to provision to hosts, comprising: means for discover target storage resources available at the target systems over the network; means for determining a configuration of virtual target storage resources mapping to the target storage resources for one of the host nodes; means for registering, with the virtual target, the configuration of the virtual target storage resources mapping to the target storage resources at the target system and an access control list of the host node allowed to access the virtual target storage resources; means for receiving a query from a requesting host node comprising one of the host nodes for the target storage resources the host node is permitted to access according to the access control list; and means for returning host discovery information to the requesting host node indicating the virtual target storage resources the requesting host node is provisioned to access from the virtual target.

Example 40 is a system comprising: means for receiving, from the discovery system, a configuration of virtual target storage resources at the virtual target mapping to target storage resources at one of the target systems and an access control list of one of the host nodes allowed to access the virtual target storage resources; means for receiving a request from one of the host nodes to establish a connection with a requested virtual target storage resource comprising one of the virtual target resources indicted in the configuration; means for determining from the access control list whether the requesting host node is authorized to access the requested virtual target storage resource; and means for communicating with the requesting host node to establish a connection with the requested virtual target to access the requested virtual target storage resource.

What is claimed is:

1. A non-transitory computer-readable medium comprising instructions stored thereon, that, if executed by at least one processor, cause the at least one processor to:
    receive a request from a host node to form a connection to access a storage resource, the storage resource comprising one or more of at least one physical storage resource or at least one virtual storage resource;
    determine if the host node is permitted to access a requested storage resource based on use of an access control list;
    based on a determination that the host node is permitted to access the requested storage resource, create administrative and input/output (I/O) queues for receiving requests from the host node associated with the requested storage resource, wherein I/O requests to access the storage resource are based on a Non-Volatile Memory Express (NVMe) protocol specification.

2. The computer-readable medium of claim 1, wherein the access control list comprises an identification of storage resources accessible to the host node, the storage resources accessible to the host node identified by one or more of: a virtual target identifier, a virtual target subsystem, a virtual controller identifier, or virtual namespace definitions.

3. The computer-readable medium of claim 2, wherein the virtual namespace definitions map to one or more physical namespaces.

4. The computer-readable medium of claim 1, comprising instructions stored thereon, that, if executed by at least one processor, cause the at least one processor to:

provide, to a target subsystem, the access control list, the access control list to identify a physical storage resource or virtual storage resource available for access by the host node and provide, to the target subsystem, an update of the access control list, the update to modify any physical storage resource or virtual storage resource available for access by the host node.

5. The computer-readable medium of claim 1, comprising instructions stored thereon, that, if executed by at least one processor, cause the at least one processor to:

provide, to a target subsystem, configuration information of one or more physical or virtual systems, wherein a configuration information of a virtual system comprises a mapping of a virtual system, virtual control, or virtual namespace to one or more physical resources.

6. The computer-readable medium of claim 1, comprising instructions stored thereon, that, if executed by at least one processor, cause the at least one processor to:

provide, to a target subsystem, a configuration command for an update of configuration information associated with a virtual system.

7. The computer-readable medium of claim 1, wherein the at least one virtual storage resource is to represent one or more physical storage resources available through a network connection.

8. A method comprising:

receiving a request from a host node to form a connection to access a storage resource, the storage resource comprising one or more of at least one physical storage resource or at least one virtual storage resource;

determining if the host node is permitted to access a requested storage resource based on use of an access control list;

based on a determination that the host node is permitted to access the requested storage resource, forming administrative and input/output (I/O) queues for receiving requests from the host node associated with the requested storage resource, wherein I/O requests to access the storage resource are based on a Non-Volatile Memory Express (NVMe) protocol specification.

9. The method of claim 8, wherein the access control list comprises an identification of storage resources accessible to the host node, the storage resources accessible to the host node identified by one or more of: a virtual target identifier, a virtual target subsystem, a virtual controller identifier, or virtual namespace definitions.

10. The method of claim 9, wherein the virtual namespace definitions map to one or more physical namespaces.

11. The method of claim 8, comprising providing, to a target subsystem, the access control list, the access control list to identify a physical storage resource or virtual storage resource available for access by the host node and providing, to the target subsystem, an update of the access control list, the update to modify any physical storage resource or virtual storage resource available for access by the host node.

12. The method of claim 8, comprising providing, to a target subsystem, configuration information of one or more physical or virtual systems, wherein a configuration information of a virtual system comprises a mapping of a virtual system, virtual control, or virtual namespace to one or more physical resources.

13. The method of claim 8, comprising providing, to a target subsystem, a configuration command for an update of configuration information associated with a virtual system.

14. The method of claim 8, wherein the at least one virtual storage resource is to represent one or more physical storage resources available through a network connection.

15. A system comprising:

at least one storage device and at least one processor communicatively coupled to the at least one storage device, the at least one processor to:

receive a request from a host node to form a connection to access a storage resource, the storage resource comprising one or more of at least one physical storage resource or at least one virtual storage resource;

determine if the host node is permitted to access a requested storage resource based on use of an access control list;

based on a determination that the host node is permitted to access the requested storage resource, create administrative and input/output (I/O) queues for receiving requests from the host node associated with the requested storage resource, wherein I/O requests to access the storage resource are based on a Non-Volatile Memory Express (NVMe) protocol specification.

16. The system of claim 15, wherein the access control list comprises an identification of storage resources accessible to the host node, the storage resources accessible to the host node identified by one or more of: a virtual target identifier, a virtual target subsystem, a virtual controller identifier, or virtual namespace definitions.

17. The system of claim 15, wherein the at least one processor is to:

provide, to a target subsystem, the access control list, the access control list to identify a physical storage resource or virtual storage resource available for access by the host node and provide, to the target subsystem, an update of the access control list, the update to modify any physical storage resource or virtual storage resource available for access by the host node.

18. The system of claim 15, wherein the at least one processor is to:

provide, to a target subsystem, configuration information of one or more physical or virtual systems, wherein a configuration information of a virtual system comprises a mapping of a virtual system, virtual control, or virtual namespace to one or more physical resources.

19. The system of claim 15, wherein the at least one virtual storage resource is to represent one or more physical storage resources available through a network connection.

* * * * *